US011973262B2

(12) United States Patent
Hong et al.

(10) Patent No.: US 11,973,262 B2
(45) Date of Patent: Apr. 30, 2024

(54) ELECTRONIC DEVICE INCLUDING ANTENNA MODULE

(71) Applicant: Samsung Electronics Co., Ltd., Gyeonggi-do (KR)

(72) Inventors: Woongsun Hong, Gyeonggi-do (KR); Hongil Kwon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 296 days.

(21) Appl. No.: 17/570,029

(22) Filed: Jan. 6, 2022

(65) Prior Publication Data

US 2022/0231403 A1 Jul. 21, 2022

Related U.S. Application Data

(63) Continuation of application No. PCT/KR2021/020060, filed on Dec. 28, 2021.

(30) Foreign Application Priority Data

Jan. 18, 2021 (KR) ........................ 10-2021-0007044

(51) Int. Cl.

*H01Q 1/24* (2006.01)
*H01Q 1/38* (2006.01)
*H01Q 9/04* (2006.01)
*H01Q 13/10* (2006.01)

(52) U.S. Cl.

CPC ............... *H01Q 1/243* (2013.01); *H01Q 1/24* (2013.01); *H01Q 1/38* (2013.01); *H01Q 9/04* (2013.01); *H01Q 9/0407* (2013.01); *H01Q 13/10* (2013.01)

(58) Field of Classification Search

CPC ............ H01Q 1/243; H01Q 1/24; H01Q 1/38; H01Q 9/0407; H01Q 9/04; H01Q 13/10

USPC .......................................................... 343/770

See application file for complete search history.

(56) References Cited

U.S. PATENT DOCUMENTS

| | | | |
|---|---|---|---|
| 9,627,769 B2 | 4/2017 | Koo et al. |
| 10,455,065 B2 | 10/2019 | Lee et al. |
| 10,709,043 B2 | 7/2020 | Yun et al. |
| 2019/0165470 A1 | 5/2019 | Jeon |
| 2019/0327834 A1 | 10/2019 | Kim et al. |
| 2019/0386378 A1 | 12/2019 | Lee et al. |

(Continued)

FOREIGN PATENT DOCUMENTS

| | | |
|---|---|---|
| KR | 10-1944340 | 1/2019 |
| KR | 1020190038264 | 4/2019 |

(Continued)

OTHER PUBLICATIONS

International Search Report dated Mar. 30, 2022 issued in counterpart application No. PCT/KR2021/020060, 9 pages.

*Primary Examiner* — Hai V Tran

(74) *Attorney, Agent, or Firm* — The Farrell Law Firm, P.C.

(57) ABSTRACT

An electronic device is provided and includes a housing, a first substrate disposed in an inner space of the housing, a second substrate disposed on a first surface of the first substrate, a third substrate disposed on a first surface of the second substrate, a first conductive patch attached to at least a partial region of the side surfaces of the first substrate, the second substrate, and the third substrate, and a second conductive patch attached to at least another partial region of the side surfaces of the first substrate, the second substrate, and the third substrate.

20 Claims, 18 Drawing Sheets

(56) References Cited

U.S. PATENT DOCUMENTS

| | | | | |
|---|---|---|---|---|
| 2020/0127404 | A1 | 4/2020 | Seo et al. | |
| 2022/0037763 | A1 | 2/2022 | Kim et al. | |
| 2022/0094036 | A1* | 3/2022 | Yong | H01Q 21/24 |
| 2022/0393349 | A1* | 12/2022 | Lee | H04B 7/0413 |
| 2022/0393705 | A1* | 12/2022 | Lee | H04B 1/0064 |
| 2022/0407233 | A1* | 12/2022 | Woo | H01Q 1/48 |
| 2023/0019425 | A1* | 1/2023 | Yong | H01Q 1/364 |

FOREIGN PATENT DOCUMENTS

| | | |
|---|---|---|
| KR | 1020190060477 | 6/2019 |
| KR | 10-2019-0087270 | 7/2019 |
| KR | 1020190123122 | 10/2019 |
| KR | 10-2019-0142128 | 12/2019 |
| KR | 1020200032911 | 3/2020 |
| KR | 10-2020-0045661 | 5/2020 |
| KR | 1020200068313 | 6/2020 |

* cited by examiner (1110)

(1150)

ELECTRONIC DEVICE INCLUDING ANTENNA MODULE

PRIORITY

This application is a Bypass Continuation Application of PCT International Application No. PCT/KR2021/020060, which was filed on Dec. 28, 2021, and claims priority to Korean Patent Application No. 10-2021-0007044, which was filed on Jan. 18, 2021, the entire content of each of which is incorporated herein by reference.

TECHNICAL FIELD

This disclosure relates generally to an electronic device including an antenna module.

BACKGROUND ART

An electronic device may include an antenna capable of transmitting/receiving signals by using frequencies in a designated range. Antennas have been developed to have efficient mounting structures for overcoming free space loss resulting from frequency characteristics and for improving gain. For example, antennas may include at least one antenna element (for example, at least one conductive pattern and/or at least one conductive patch) disposed on a printed circuit board (PCB). At least one antenna element described above may be disposed to have a radiation pattern formed in at least one direction inside the electronic device.

However, the radiation direction may be limited, depending on the state of disposition of the electronic device and/or whether or not the same is gripped, and this may degrade the antenna radiation performance.

SUMMARY

The present disclosure has been made to address the above-mentioned problems and disadvantages, and to provide at least the advantages described below.

An electronic device may include at least two substrates (for example, at least two PCBs) disposed in the inner space. Respective substrates may be disposed so as to be laminated on each other, and may be electrically connected to each other via a laminated substrate (for example, an interposer) disposed therebetween.

Various embodiments of the disclosure may provide an electronic device capable of maintaining a stable antenna performance regardless of the state of disposition of the electronic device and/or whether or not the same is gripped.

According to an aspect of the disclosure, an electronic device includes a housing, a first substrate disposed in an inner space of the housing, a second substrate disposed on a first surface of the first substrate, a third substrate disposed on a first surface of the second substrate, a first conductive patch attached to at least a partial region of side surfaces of the first substrate, the second substrate, and the third substrate, and a second conductive patch attached to at least another partial region of the side surfaces of the first substrate, the second substrate, and the third substrate, wherein the first conductive patch and the second conductive patch are connected to each other via a first electrical path and a second electrical path, wherein a feeding point on the first electrical path is electrically connected to a communication circuit disposed on the first surface of the first substrate via a third electrical path and, wherein the second electrical path is electrically connected to a ground disposed on a second surface of the first substrate.

An electronic device according to various embodiments of the disclosure may operate as a slot antenna by connecting, via an electric path, side surfaces of at least two substrates and at least two conductive patches attached so as to connect at least some regions of side surfaces of laminated substrates, and by connecting the same to a communication circuit, such that a stable radiation performance is provided.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
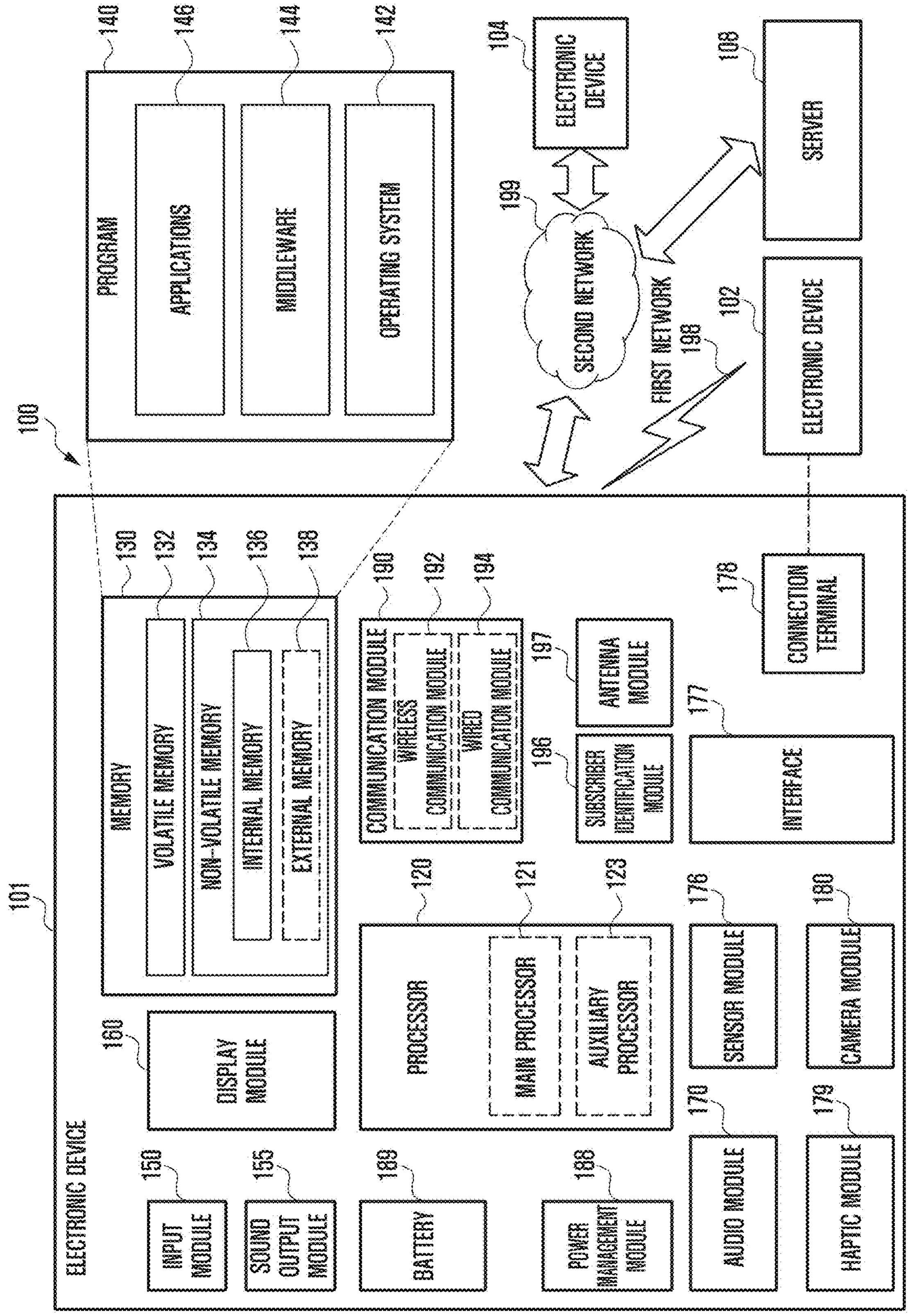
FIG. 1 is a block diagram of an electronic device in a network environment, according to an embodiment.

FIG. 1 is a block diagram illustrating an electronic device 101 in a network environment 100, according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a PCB). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., an mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
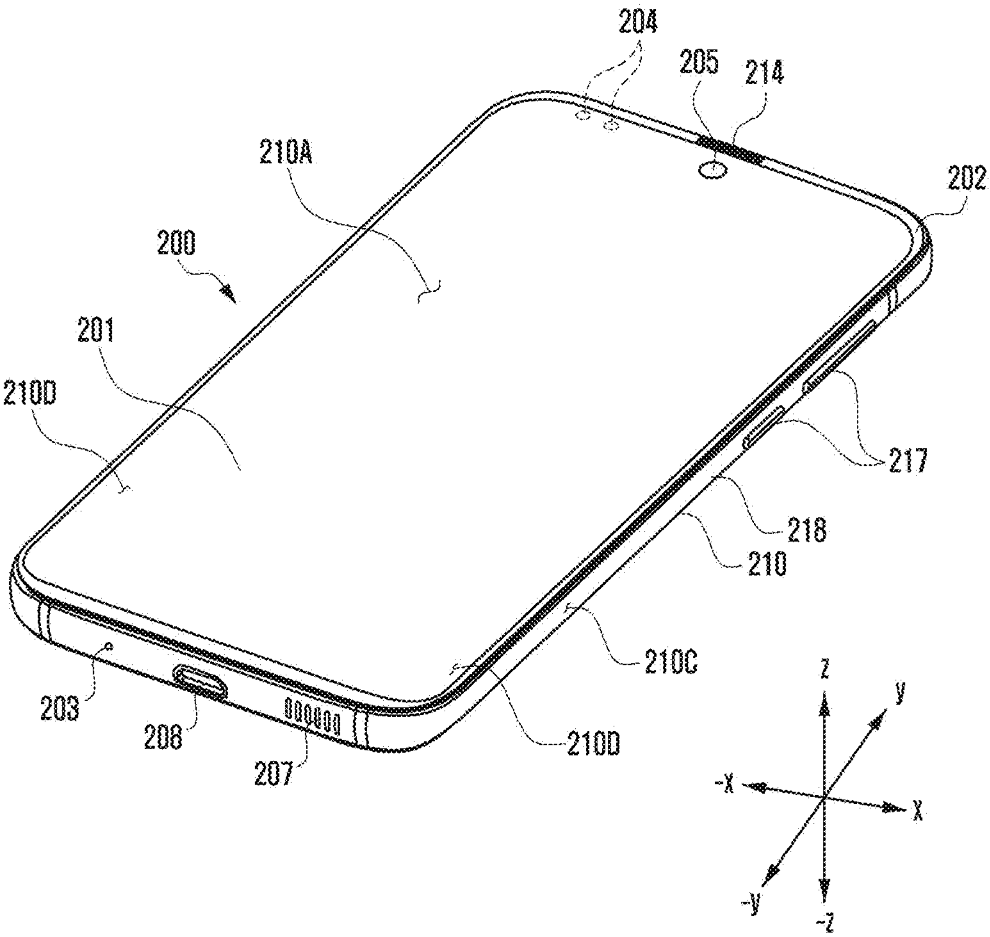
FIG. 2A is a perspective view of a front side of an electronic device, according to an embodiment.
Figure 2B:
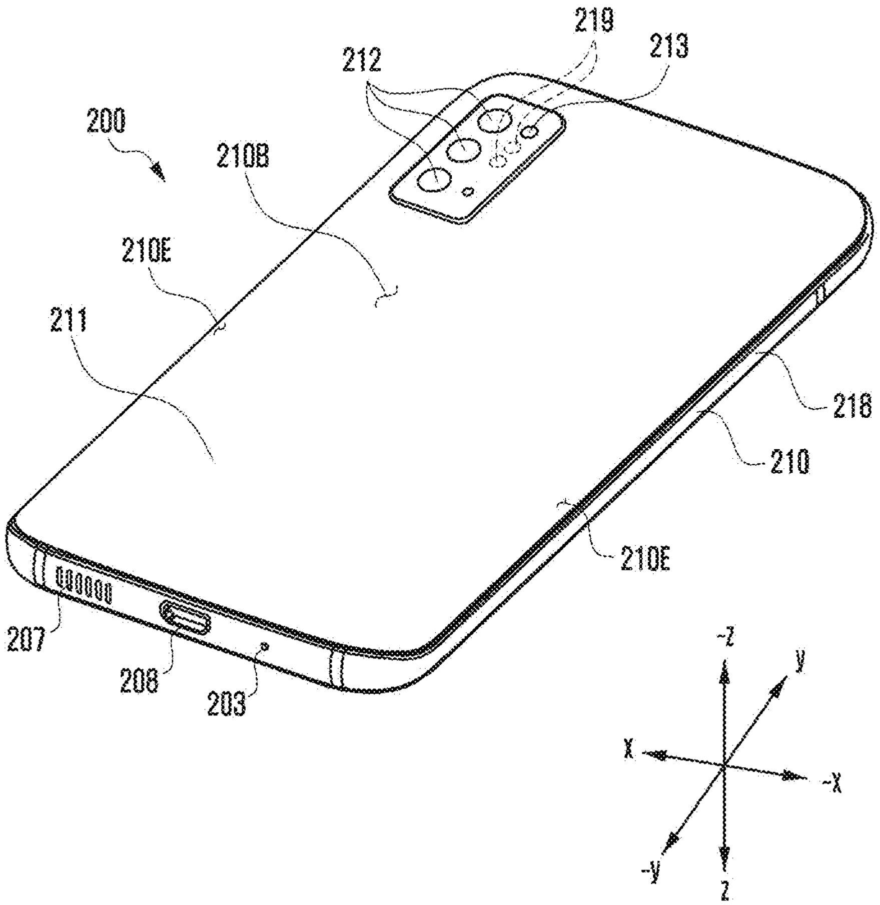
FIG. 2B is a perspective view of a rear side of the electronic device of FIG. 2A, according to an embodiment.

FIG. 2A illustrates a perspective view showing a front surface of an electronic device 200, according to an embodiment. FIG. 2B illustrates a perspective view showing a rear surface of the electronic device 200 shown in FIG. 2A, according to an embodiment.

The electronic device 200 shown in FIGS. 2A and 2B may be similar, at least in part, to the electronic device 101 in FIG. 1, or may further include another embodiment of the electronic device.

Referring to FIGS. 2A and 2B, an electronic device 200 includes a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 111 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the electronic device 200, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

The electronic device 200 may include at least one of a display 201, an input device 203, sound output devices 207 and 214, sensor modules 204 and 219, camera modules 205, 212, and 213, a key input device 217, an indicator, and connector 208. The electronic device 200 may omit at least one (e.g., the key input device 217 or the indicator) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E.

The input device 203 may include a microphone. In some embodiments, the input device 203 may include a plurality of microphones arranged to sense the direction of the sound. The sound output devices 207 and 214 may include speakers. The speakers may include an external speaker and a receiver for a call. In some embodiments, the microphone, the speakers, and the connector 208 are disposed in the space of the electronic device 200 and may be exposed to the external environment through at least one hole formed in the housing 210. A hole formed in the housing 210 may be used in common for the microphone and speakers. The sound output devices may include a speaker (e.g., a piezo speaker) that operates while excluding a hole formed in the housing 210.

The sensor modules 204 and 219 may generate electrical signals or data corresponding to an internal operating state of the electronic device 200 or to an external environmental condition. The sensor modules 204 and 219 may include a first sensor module (e.g., a proximity sensor), a second sensor module (e.g., a fingerprint sensor) disposed on the first surface 210A of the housing 210, a third sensor module (e.g., a heart rate monitor (HRM) sensor), and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an IR sensor, a biometric sensor, a temperature sensor, a humidity sensor, or an illuminance sensor.

The camera modules 205, 212, and 213 may include a first camera device (e.g., camera module) disposed on the first surface 210A of the electronic device 200, and a second camera device and/or a flash disposed on the second surface 210B. The camera module 205 or the camera module 212 may include one or more lenses, an image sensor, and/or an ISP. The flash 213 may include, for example, a light emitting diode (LED) or a xenon lamp. Two or more lenses (e.g., wide angle and telephoto lenses) and image sensors may be disposed on one side of the electronic device 200.

The key input device 217 may be disposed on the lateral surface 210C of the housing 210. The electronic device 200 may not include some or all of the components of the key input device 217 described above, and the components of the key input device 217 which are not included may be implemented in another form such as a soft key on the display 201. The key input device 217 may include the sensor module disposed on the second surface 210B of the housing 210. Additionally or alternatively, the key input device 217 may be implemented using a pressure sensor included in the display 201.

The indicator may be disposed on the first surface 210A of the housing 210. For example, the indicator may provide status information of the electronic device 200 in an optical form. The indicator (e.g., an LED) may provide a light source associated with the operation of the camera module 205. The indicator may include, for example, an LED, an IR LED, or a xenon lamp.

The connector hole 208 may include a first connector hole 208 adapted for a connector (e.g., a USB connector) for transmitting and receiving power and/or data to and from an external electronic device. The connector hole 208 may include a second connector hole adapted for a connector (e.g., an earphone jack) for transmitting and receiving an audio signal to and from an external electronic device.

Some camera modules of camera modules 205 and 212, some sensor modules of sensor modules 204 and 219, or an indicator may be arranged to be exposed through a display 201. For example, the camera module 205, the sensor module 204, or the indicator may be arranged in the internal space of an electronic device 200 so as to be brought into contact with an external environment through an opening of the display 201, which is perforated up to a front plate 202. The area facing the camera module 205 of the display 201 may be formed as a transparent area having a designated transmittance as a part of an area displaying content. The transmissive region may have a transmittance ranging from about 5% to about 20%. Such a transmissive region may include a region overlapping an effective region (e.g., an angle of view region) of the camera module 205 through which light for generating an image by an image sensor passes. The transparent area of the display 201 may include an area having a lower pixel density or wiring density or both than the surrounding area. The transmissive area may replace the aforementioned opening. The camera module 205 may include an under display camera (UDC). The sensor module 204 may be arranged to perform functions without being visually exposed through the display 201 in the internal space of the electronic device 200. For example, in this case, an area of the display 201 facing the sensor module may not require a perforated opening.

Figure 3:
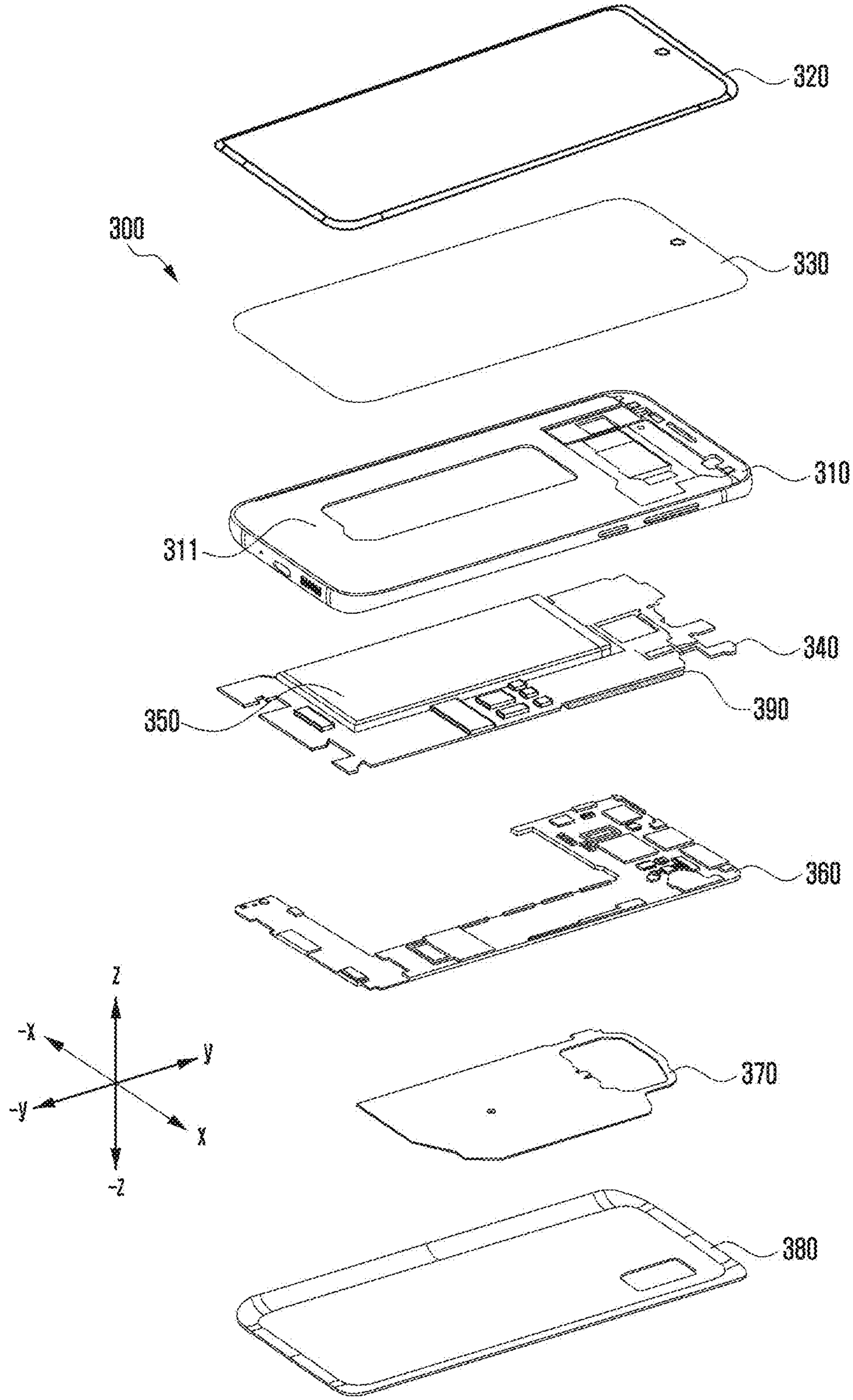
FIG. 3 is an exploded perspective view of an electronic device, according to an embodiment.

FIG. 3 illustrates an exploded perspective view showing an electronic device 300, according to an embodiment.

The electronic device 300 shown in FIG. 3 may be similar, at least in part, to the electronic device 101 in FIG. 1, or to the electronic device 200 in FIGS. 2A and 2B, and may further include another embodiment of the electronic device.

Referring to FIG. 3, an electronic device 300 includes a lateral bezel structure 310, a first support member 311 (e.g., a bracket or a support structure), a front plate 320 (e.g., a front cover), a display 330, a PCB 340, a battery 350, a second support member 360 (e.g., a rear case), a flexible PCB (FPCB) 370, and a rear plate 380 (e.g., a rear cover). The electronic device 300 may omit at least one of the above components (e.g., the first support member 311 or the second support member 360) or may further include another component. Some components of the electronic device 300 may be the same as or similar to those of the electronic device 200 shown in FIG. 2A or FIG. 2B, thus, descriptions thereof are omitted below.

The first support member 311 is disposed inside the electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. A processor 120, a memory 130, and/or an interface 177 may be mounted on the PCB 340.

The PCB 340 may include a first substrate, a second substrate (e.g., a laminated substrate (e.g., an interposer)) disposed on a first surface (e.g., a first surface facing in a first direction (e.g., the −z axis direction)) of the first substrate, and a third substrate (e.g., a sub-substrate) disposed on a first surface (e.g., first surface facing in the first direction (e.g., the −z axis direction)) of the second substrate. The electronic device 300 may include at least two conductive patches attached to connect a side surface of the first substrate, a side surface of the second substrate, and/or a side surface of the third substrate to one another. A first conductive patch and a second conductive patch may be used as a slot antenna 390 operating in a predetermined frequency band (e.g., about 2.4 gigahertz (GHz) to 30 GHz band) by being electrically connected to a communication circuit disposed on the first surface of the first substrate. In relation to the slot antenna 390, various embodiments will be described with reference to FIGS. 4 to 17 described below.

The processor may include, for example, one or more of a CPU, an AP, a GPU, an ISP, a sensor hub processor, or a CP.

The memory may include, for example, one or more of a volatile memory 132 and a non-volatile memory 134.

The interface may include, for example, an HDMI, a USB interface, an SD card interface, and/or an audio interface. The interface may electrically or physically connect the electronic device 300 with an external electronic device and may include a USB connector, an SD card/multimedia card (MMC) connector, or an audio connector.

The battery 350 is a device for supplying power to at least one component of the electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the electronic device 300, and may be detachably disposed from the electronic device 300.

The FPCB 370 may include an antenna. The antenna may include, for example, a magnetic secure transmission (MST) antenna, a near field communication (NFC) antenna, and/or a wireless charging antenna. The FPCB 370 may be positioned between the rear plate 380 and the second support member 360 (e.g., attached to the rear plate 380). The antenna may perform short-range communication with an external device, or transmit and receive power required for charging wirelessly. An antenna structure may be formed by a part or combination of the lateral bezel structure 310 and/or the first support member 311.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
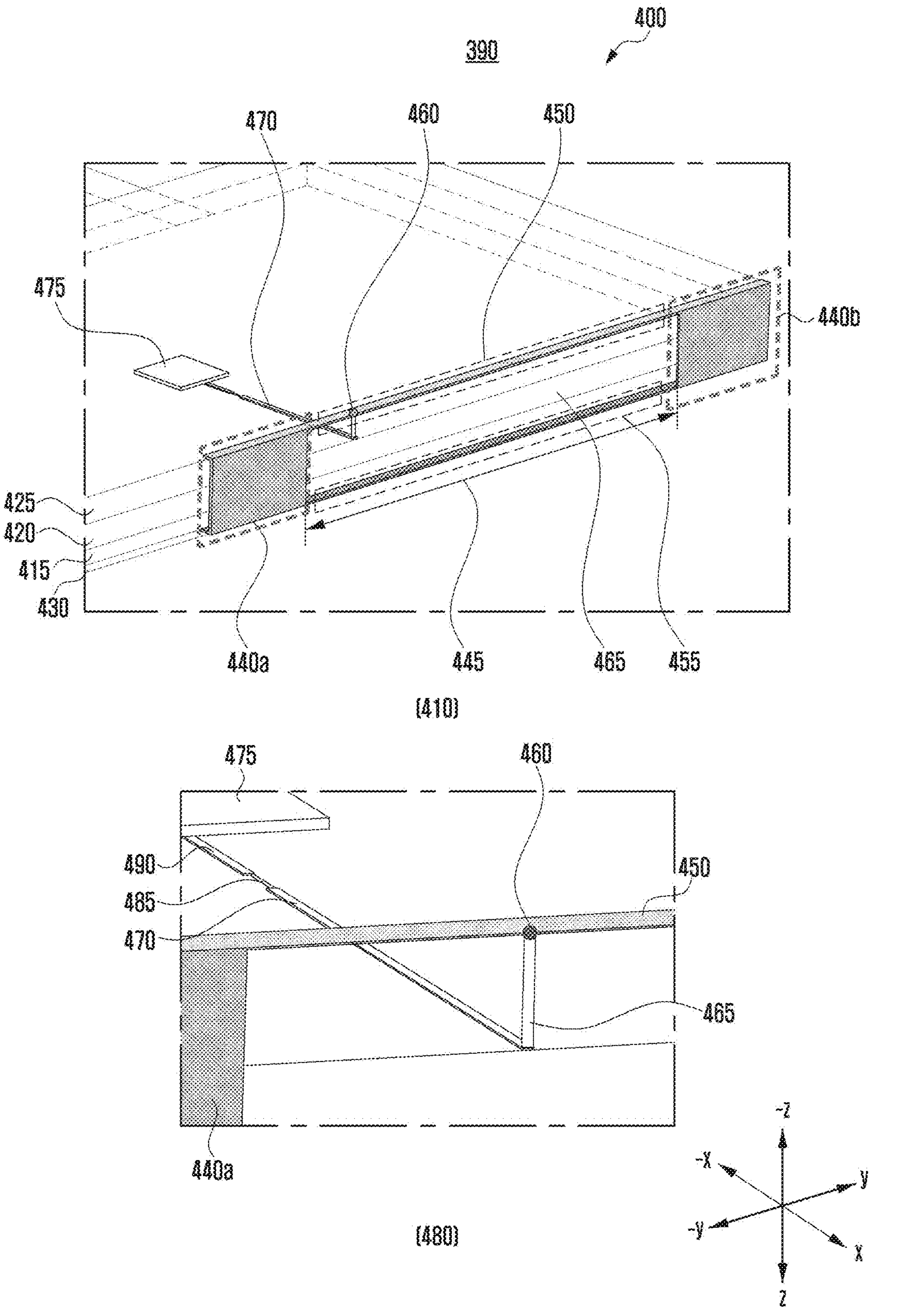
FIG. 4 is a diagram illustrating a slot antenna, according to an embodiment.

FIG. 4 is a diagram 400 illustrating the slot antenna 390, according to an embodiment.

Referring to FIG. 4, the electronic device 200 includes a first support member 311 disposed in an inner space thereof. The first support member 311 may be disposed to extend from the side member 310 into the inner space. The first support member 311 may also be separately provided in the inner space of the electronic device 200. The first support member 311 may extend from the side member 310 and may have at least a partial region formed of a conductive material.

The electronic device 200 may include a substrate (e.g., the PCB 340 of FIG. 3) in the inner space to be placed between the first support member 311 and the rear cover (e.g., the rear plate 380 of FIG. 3). The substrate may be arranged such that at least a partial region thereof overlaps the front plate when the front plate 320 is viewed from above.

As shown by reference numeral 410, the substrate may include a first substrate 415 (e.g., a main substrate), a second substrate 420 (e.g., a laminated substrate (e.g., an interposer)) disposed on a first surface (e.g., first surface facing in a first direction (e.g., the −z axis direction)) of the first substrate 415, and a third substrate 425 (e.g., a sub-substrate) disposed on a first surface (e.g., a first surface facing in the first direction (e.g., the −z axis direction)) of the second substrate 420. A ground 430 may be disposed on a second surface (e.g., a second surface facing in a second direction (e.g., the z-axis direction) opposite to the first direction) of the first substrate 415.

The second substrate 420 may include a plurality of conductive vias for transmitting and receiving electrical signals and may be in physical contact with conductive terminals disposed on two substrates (e.g., the first substrate 415 and the third substrate 425) to be electrically connected to the two substrates (e.g., the first substrate 415 and the third substrate 425).

The second substrate 420 may be mounted on the first substrate 415 through pre-solder applied to the conductive terminal thereof. The second substrate 420 may be mounted on the third substrate 425 through pre-solder applied to the conductive terminal thereof.

The electronic device 200 may include a second support member (e.g., the second support member 360 of FIG. 3) disposed between the third substrate 425 and the rear cover 380. The second support member 360 may be disposed at a position at which the same at least partially overlaps the third substrate 425. The second support member 360 may include a metal plate. Accordingly, the first substrate 415, the second substrate 420, and the third substrate 425 may be fixed to the first support member 311 through the second support member 360 disposed on the top thereof. For example, the second support member 360 may be fastened to the first support member 311 through a fastening member such as a screw, thereby firmly supporting electrical connection between the first substrate 415, the second substrate 420, and the third substrate 425. In addition, the first substrate 415, the second substrate 420, and the third substrate 425 may be disposed in the inner space of the electronic device 200 without the second support member 360.

The electronic device 200 may include at least two conductive patches 440*a* and 440*b* attached to connect a side surface of the first substrate 415, a side surface of the second substrate 420, and a side surface of the third substrate 425 to one another. For example, the first conductive patch 440*a* may be attached to at least a partial region of the side surfaces of the first substrate 415, the second substrate 420, and the third substrate 425. The second conductive patch 440*b* may be attached to at least another partial region of the side surfaces of the first substrate 415, the second substrate 420, and the third substrate 425.

The first conductive patch 440*a* and the second conductive patch 440*b* may be attached to be spaced apart from each other by a predetermined interval 445.

The first conductive patch 440*a* and the second conductive patch 440*b* may be connected to each other through a first electrical path 450 and a second electrical path 455.

A feeding point 460 on a first electrical path 450 may be connected to the communication circuit 475 (e.g., the communication module 190 of FIG. 1) disposed on the first surface (e.g., the first surface facing in the first direction (e.g., the −z axis direction)) of the first substrate 415 via a third electrical path 470 (e.g., signal line formed in the second substrate 420).

The first conductive patch 440*a* and the second conductive patch 440*b* may be connected to the ground 430 disposed on the second surface of the first substrate 415 via a second electrical path 455.

The first conductive patch 440*a* and the second conductive patch 440*b* may be used as a slot antenna 390 operating in a predetermined frequency band (e.g., about 2.4 GHz to 30 GHz band) by being electrically connected to the communication circuit 475 disposed on the first surface of the first substrate 415 in the inner space of the electronic device 200. For example, the first conductive patch 440*a* and the second conductive patch 440*b* may be attached to connect a side surface of the first substrate 415, a side surface of the second substrate 420, and a side surface of the third substrate 425 to one another and may be connected to each other via the first electrical path 450 and the second electrical path 455, thereby forming a slot 465. The feeding point 460 on the first electrical path 450 may be connected to the communication circuit 475 via the third electrical path 470 and the second electrical path 455 may be connected to the ground 430, whereby the first substrate 415, the second substrate 420, the third substrate 425, the first conductive patch 440*a*, the second conductive patch 440*b*, and the slot 465 may operate as a slot antenna 390.

An antenna structure may be disposed on the second surface (e.g., the second surface facing in the second direction (e.g., the z axis direction)) of the ground 430. The antenna structure may include a plurality of conductive patterns, and the plurality of conductive patterns may include a plurality of patch antennas.

The electronic device 200 may control activation of each of the plurality of patch antennas (e.g., a plurality of ultra wide band (UWB) antenna modules) and/or the slot antenna 390, based on an arrangement state (e.g., a longitudinal mode, a portrait mode, a transverse mode, or a landscape mode) of the electronic device 200 and/or whether the electronic device 200 is gripped or not.

For example, at least one of the plurality of patch antennas may be used as an antenna for transmitting and receiving a wireless signal (e.g., UWB signal), and at least another patch antenna may be used as an antenna for receiving a wireless signal. When an antenna for transmitting and receiving a wireless signal is deactivated, the electronic device 200 may perform control such that a wireless signal is transmitted and received using the slot antenna 390 instead of the deactivated antenna for transmitting and receiving a wireless signal. Additionally, when an antenna for receiving a wireless signal is deactivated, the electronic device 200 may perform control such that a wireless signal is received using the slot antenna 390 instead of the deactivated antenna for receiving a wireless signal.

The plurality of conductive patterns have been described assuming a plurality of patch antennas, but are not limited thereto. The plurality of conductive patterns may include a plurality of sub-6 antenna modules.

Reference numeral 480 is an enlarged portion where the feeding point 460 on the first electrical path 450 is connected to the communication circuit 475.

The feeding line 465 formed in a vertical direction from the feeding point 460 on the first electrical path 450 to the second substrate 420 may be connected to the third electrical path 470 (e.g., a signal line formed in the second substrate 420). The third electrical path 470 may be electrically connected to the communication circuit 475 through the connector 485 and the transmission line 490.

Figure 5:
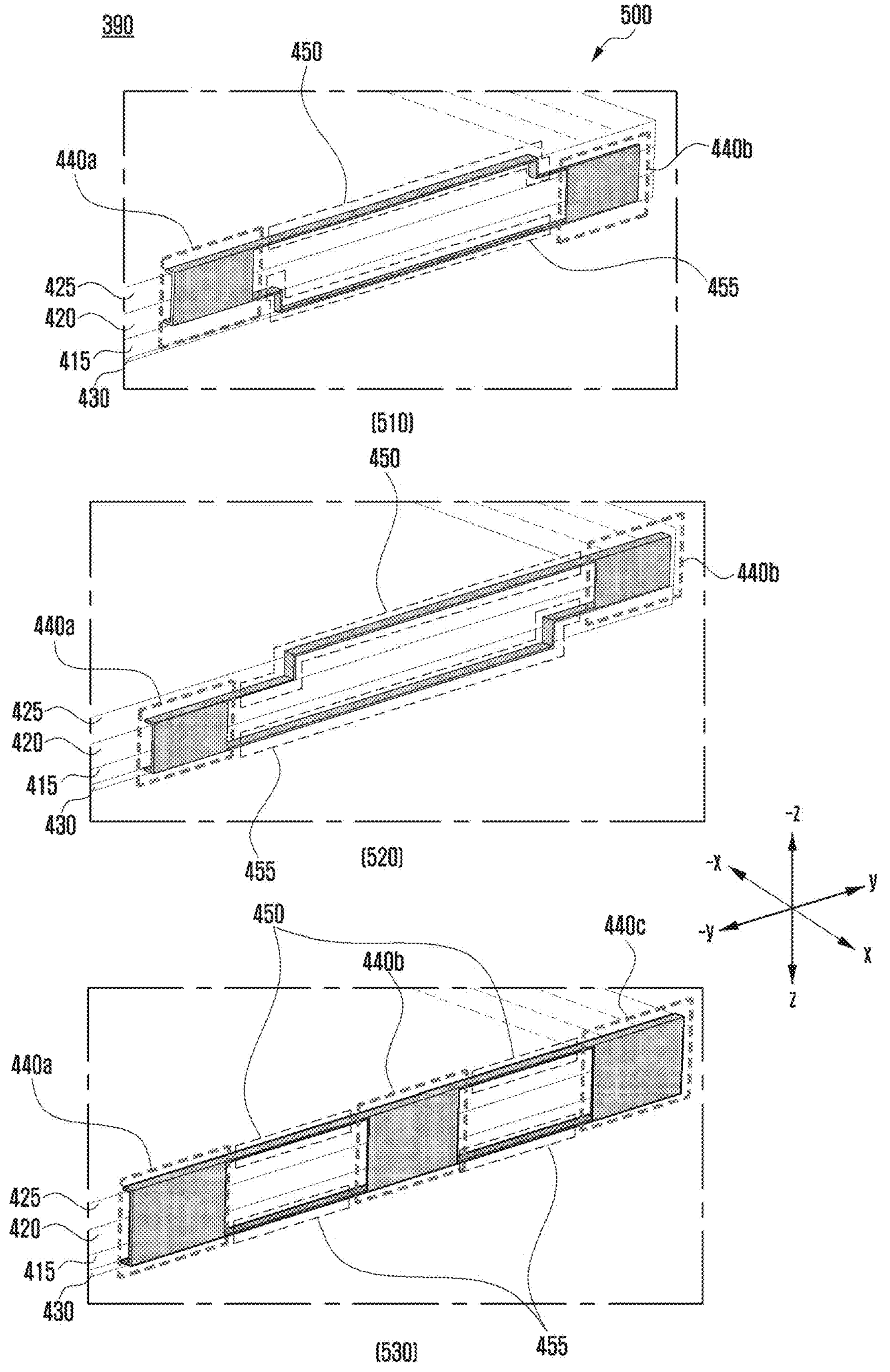
FIG. 5 is a diagram illustrating a slot antenna having a plurality of various types of conductive patches attached thereto, according to an embodiment.

In FIG. 4, the two conductive patches (e.g., the first conductive patch 440*a* and the second conductive patch 440*b*) are illustrated to be attached to the side surfaces of the first substrate 415, the second substrate 420, and the third substrate 425, but are not limited thereto. For example, more than two conductive patches may be attached to the side surfaces of the first substrate 415, the second substrate 420, and the third substrate 425 and/or may be implemented in various forms. FIG. 5 is a diagram 500 illustrating the slot antenna 390 having a plurality of various types of conductive patches attached thereto, according to an embodiment.

In describing elements of the electronic device 200 illustrated in FIG. 5, the same reference numerals are assigned to the elements substantially the same as those of the electronic device 200 of FIG. 4, and a detailed description thereof may be omitted.

Referring to FIG. 5, the electronic device 200 includes at least two conductive patches 440*a* and 440*b* attached to connect a side surface of the first substrate 415, a side surface of the second substrate 420, and/or a side surface of the third substrate 425 to one another.

As shown by reference numeral 510, the electronic device 200 may include a first conductive patch 440*a* attached to at least a partial region of side surfaces of the second substrate 420 and the third substrate 425, and a second conductive patch 440*b* attached to at least another partial region of side surfaces of the first substrate 415 and the second substrate 420. The first conductive patch 440*a* and the second conductive patch 440*b* may be connected to a communication circuit (e.g., the communication circuit 475 of FIG. 4) via the first electrical path 450. The first conductive patch 440*a* and the second conductive patch 440*b* may be connected to the ground 430 via a second electrical path 455.

As shown by reference numeral 520, the electronic device 200 may include a first conductive patch 440*a* attached to at least a partial region of side surfaces of the first substrate 415 and the second substrate 420, and a second conductive patch 440*b* attached to at least another partial region of side surfaces of the second substrate 420 and the third substrate 425.

As shown by reference numeral 530, the electronic device 200 may include a first conductive patch 440*a*, a second conductive patch 440*b*, and a third conductive patch 440*c* attached to side surfaces of the first substrate 415, the second substrate 420, and the third substrate 425. The first conductive patch 440*a*, the second conductive patch 440*b*, and the third conductive patch 440*c* may be attached to be spaced apart from each one another by a predetermined interval. The first conductive patch 440*a*, the second conductive patch 440*b*, and the third conductive patch 440*c* may be connected to the communication circuit 475 via the first electrical path 450. The first conductive patch 440*a*, the second conductive patch 440*b*, and the third conductive patch 440*c* may be connected to the ground 430 via the second electrical path 455.

Figure 6:
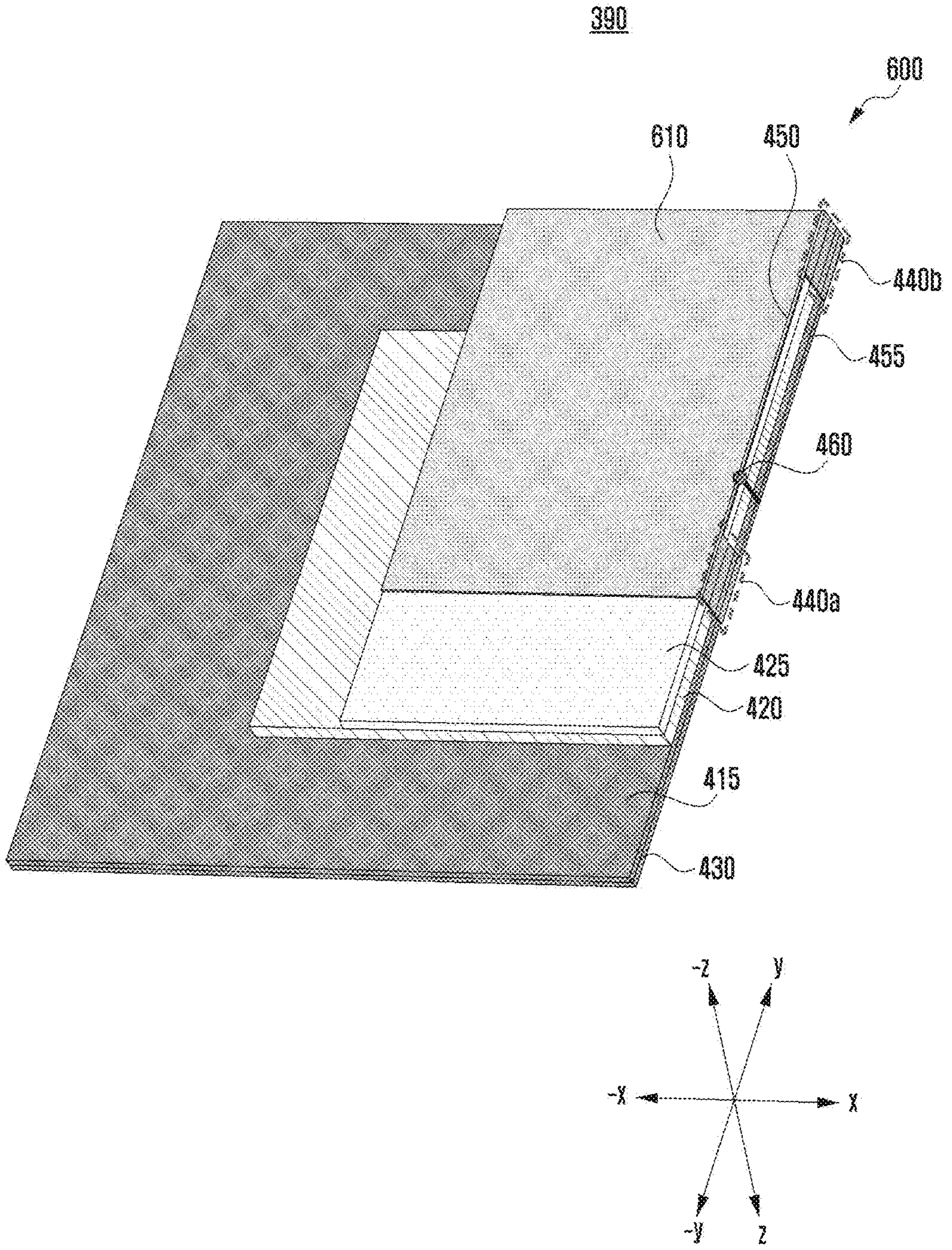
FIG. 6 is a diagram illustrating a slot antenna, according to an embodiment.
Figure 7:
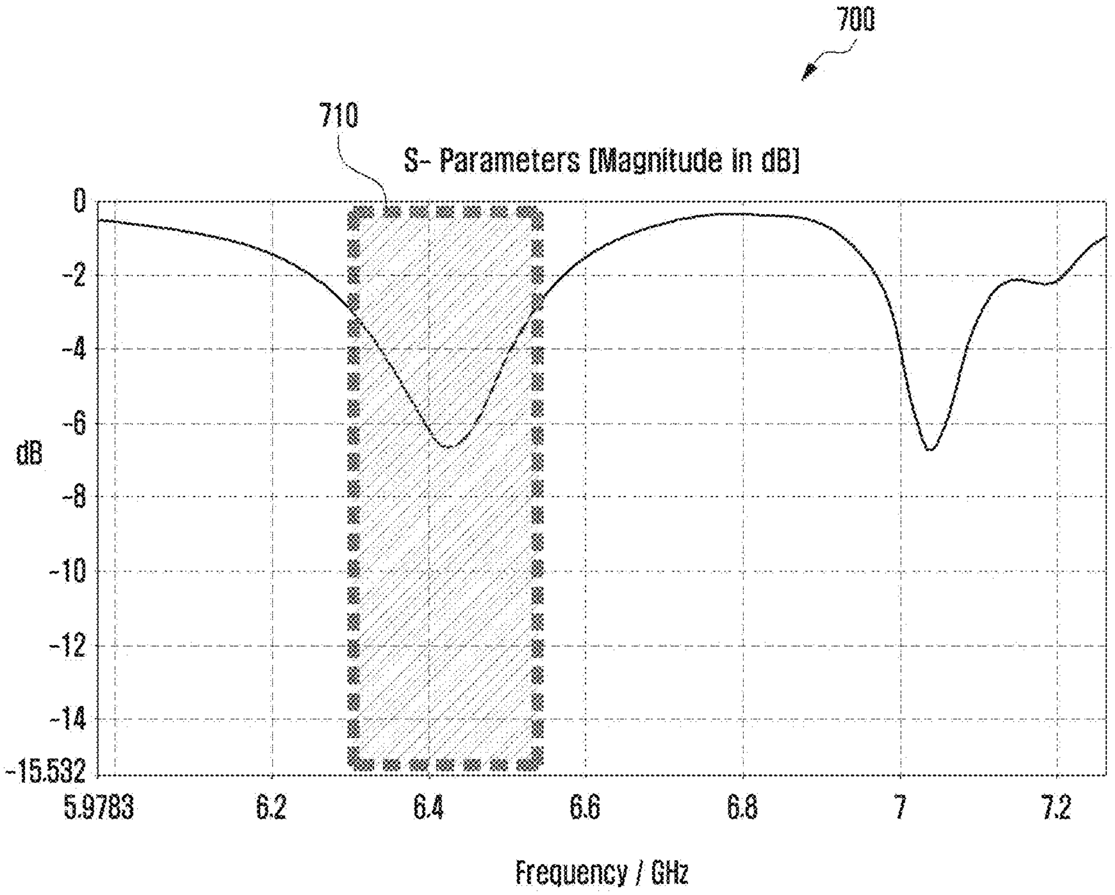
FIG. 7 is a diagram illustrating a resonant frequency of the slot antenna of FIG. 6, according to an embodiment.

FIG. 6 is a diagram 600 illustrating the slot antenna 390, according to an embodiment. FIG. 7 is a diagram 700 illustrating a resonant frequency of the slot antenna 390 of FIG. 6, according to an embodiment.

Referring to FIG. 6, the electronic device 200 includes a first substrate 415, a second substrate 420 disposed on a first surface (e.g., the first surface facing in the first direction (e.g., the −z axis direction) of FIG. 4) of the first substrate 415, and a third substrate 425 disposed on a first surface (e.g., the first surface facing in the first direction (e.g., the −z axis direction) of FIG. 4) of the second substrate 420.

Grounds (e.g., nodes connected to Ground) 430 and 610 may be disposed on a second surface (e.g., the second surface facing in a second direction (e.g., the z axis direction opposite to the first direction)) of the first substrate 415 and on a first surface (e.g., the first surface facing in the first direction (e.g., the −z axis direction) of FIG. 4) of the third substrate 425, respectively. The electronic device 200 may include at least two conductive patches (e.g., the first conductive patch 440*a* and the second conductive patch 440*b*) attached to connect a side surface of the first substrate 415, a side surface of the second substrate 420, and a side surface of the third substrate 425 to one another.

A feeding point 460 on the first electrical path 450 may be electrically connected to the communication circuit 475 disposed on the first surface (e.g., the first surface facing in the first direction (e.g., the −z axis direction) of FIG. 4) of the first substrate 415 via the third electrical path 470.

The first conductive patch 440*a* and the second conductive patch 440*b* may be attached to connect side surfaces of the first substrate 415, the second substrate 420, and the third substrate 425, and may be electrically connected to the communication circuit 475 disposed on the first surface of the first substrate 415 via the first electrical path 450. The second electrical path 455 may be connected to the ground 430. Accordingly, the first conductive patch 440*a* and the second conductive patch 440*b* may be used as a slot antenna 390 operating in a predetermined frequency band (e.g., about 2.4 GHz to 30 GHz band).

Referring to FIG. 7, when the communication circuit 475 is electrically connected to the feeding point 460 at a specific location on the first electrical path 450, the slot antenna 390 operating in a specific frequency band 710 (e.g., about 6.4 GHz band) may be available. For example, the slot antenna 390 may be implemented to be resonant in a UWB band-based frequency band (e.g., about 6 GHz band).

The frequency band of the resonant frequency of the slot antenna 390 may vary according to a position of the feeding point 460 on the first electrical path 450.

When the communication circuit 475 is electrically connected to the feeding point 460 on the first electrical path 450, the frequency band may vary according to the territoriality (e.g., the number of grounds provided in the electronic device 200) of the ground.

As shown in FIGS. 6 and 7 above, in a case where the communication circuit 475 is electrically connected to the feeding point 460 at a specific position on the first electrical path 450 even when the ground 610 is further disposed on the first surface (e.g., the first surface facing in the first direction (e.g., the −z axis direction) of FIG. 4) of the third substrate 425, a difference in the frequency band of the resonant frequency may not be present, compared to when the ground 610 is not disposed on the first surface of the third substrate 425.

Figure 8:
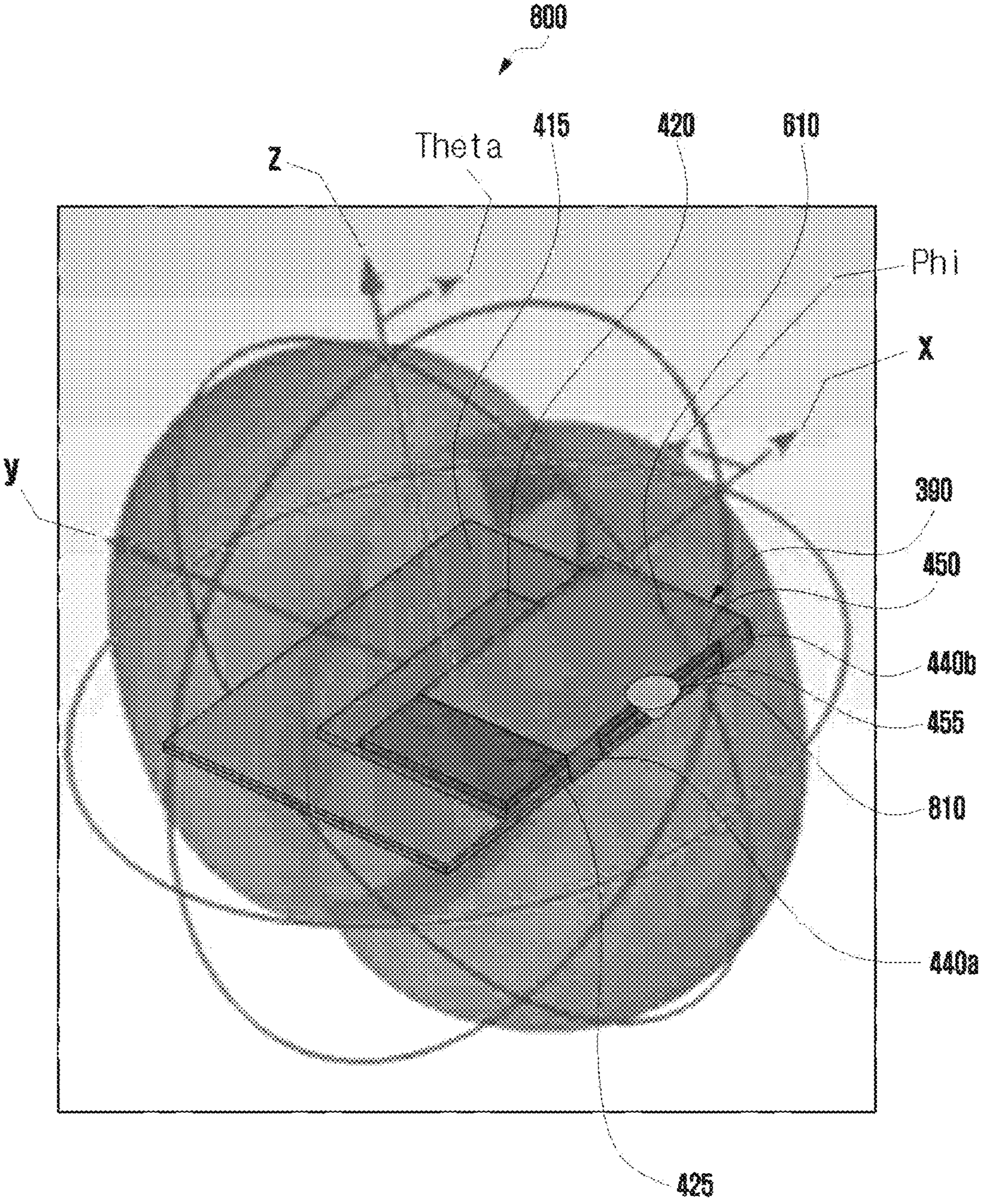
FIG. 8 is a diagram illustrating a radiation pattern of the slot antenna of FIG. 6, according to an embodiment.
Figure 9:
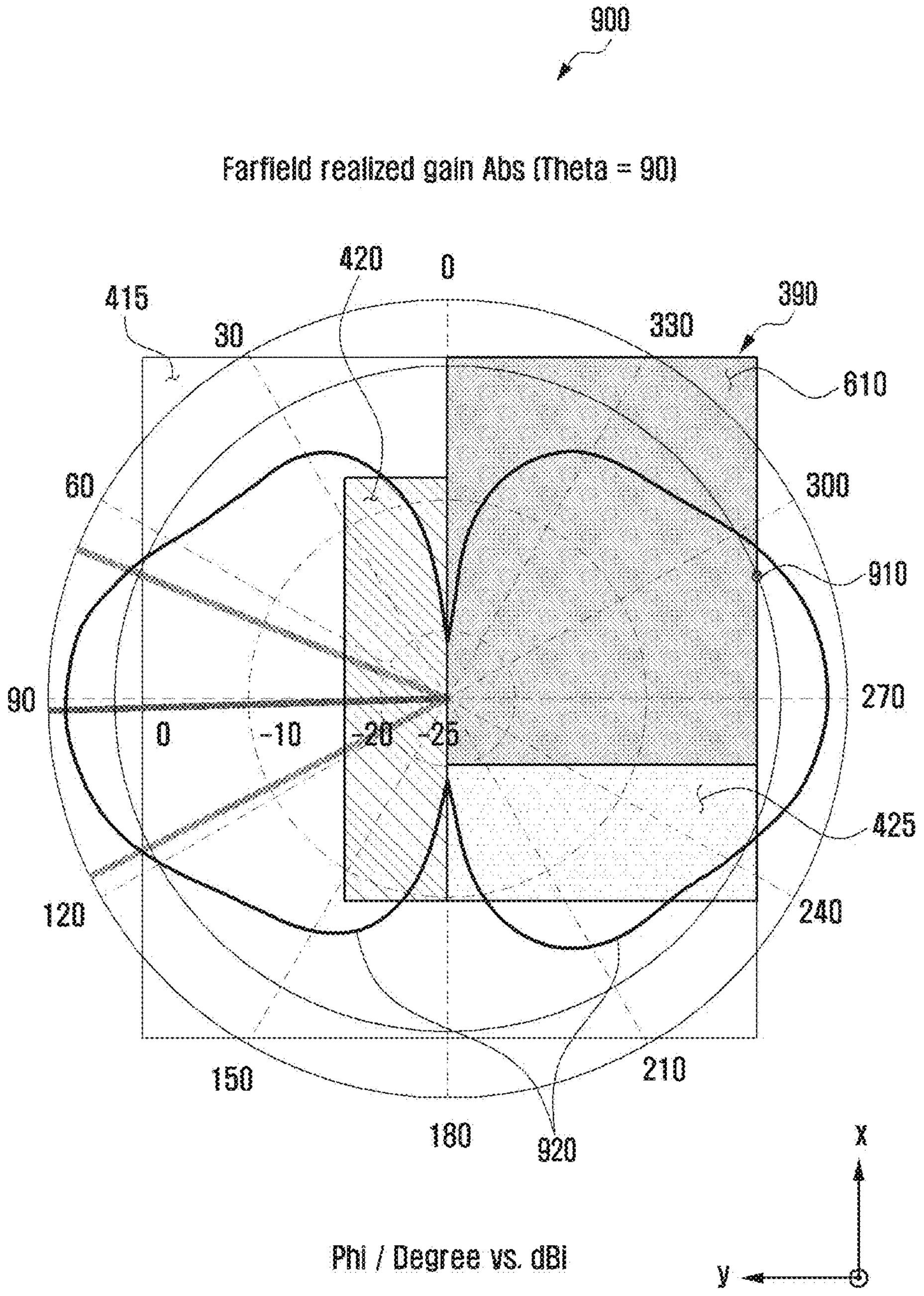
FIG. 9 is a diagram illustrating a radiation pattern of the slot antenna of FIG. 6, according to an embodiment.

FIG. 8 is a diagram 800 illustrating a radiation pattern of the slot antenna 390 of FIG. 6, according to an embodiment. FIG. 9 is a diagram 900 illustrating a radiation pattern of the slot antenna 390 of FIG. 6, according to an embodiment.

FIGS. 8 and 9, according to various embodiments, illustrate a radiation pattern according to a feeding position of the slot antenna 390 having the structure of FIG. 6, described above.

Referring to FIGS. 8 and 9, the electronic device 200 includes at least two conductive patches 440*a* and 440*b* attached to connect a side surface of the first substrate 415, a side surface of the second substrate 420, and a side surface of the third substrate 425 to one another. The first conductive patch 440*a* and the second conductive patch 440*b* may be connected to each other via the first electrical path 450 and the second electrical path 455. A ground 610 may be further disposed on the first surface (e.g., the first surface facing in the first direction (e.g., −z axis direction) of FIG. 4) of the third substrate 425.

When feeding points 810 and 910 (e.g., the feeding point 460 of FIG. 4) on the first electrical path 450 are electrically connected to a communication circuit 475, the slot antenna 390 may have a radiation pattern 920 in which energy is contracted to side surfaces (e.g., the y axis) of the first substrate 415, the second substrate 420, and the third substrate 425 to which the first conductive patch 440*a* and the second conductive patch 440*b* are attached.

The electronic device 200 may include an antenna structure including a plurality of patch antennas (e.g., a plurality of UWB antenna modules). A plurality of patch antennas may have a radiation pattern formed in the z axis direction (e.g., the z axis and the −z axis of FIG. 4). The slot antenna 390 may be activated in place of one of the patch antennas of the plurality of patch antennas, based on an arrangement state (e.g., a longitudinal mode, portrait mode, a transverse mode, or landscape mode) and/or whether the electronic device 200 is gripped or not. The activation of the slot antenna 390 may improve the performance of the antenna due to the radiation pattern formed in the y axis direction of the side surface as well as in the z axis.

The electronic device 200 may control activation of each of the plurality of patch antennas (e.g., a plurality of UWB antenna modules) and/or the slot antenna 390, based on an arrangement state (e.g., a longitudinal mode, portrait mode, a transverse mode, or landscape mode) of the electronic device 200 and/or a whether the electronic device 200 is gripped or not. For example, based on an arrangement state (e.g., a longitudinal mode, portrait mode, a transverse mode, or landscape mode) of the electronic device 200 and/or a whether the electronic device 200 is gripped or not, the electronic device 200 may perform control such that when a patch antenna having low antenna performance for transmitting and/or receiving a wireless signal, among the plurality of antennas is deactivated, a wireless signal is transmitted and/or received using the slot antenna 390 instead of the patch antenna for transmitting and/or receiving a wireless signal.

The radiation pattern formed in the y axis direction of the side surface as well as in the z axis by using the slot antenna 390 and at least one patch antenna excluding the deactivated patch antenna among the plurality of patch antennas may enable the calculation of an angle of arrival (AoA) of a wireless signal received from an external electronic device, by using at least two antennas and the location of the external electronic device may be identified using the AoA.

Figure 10:
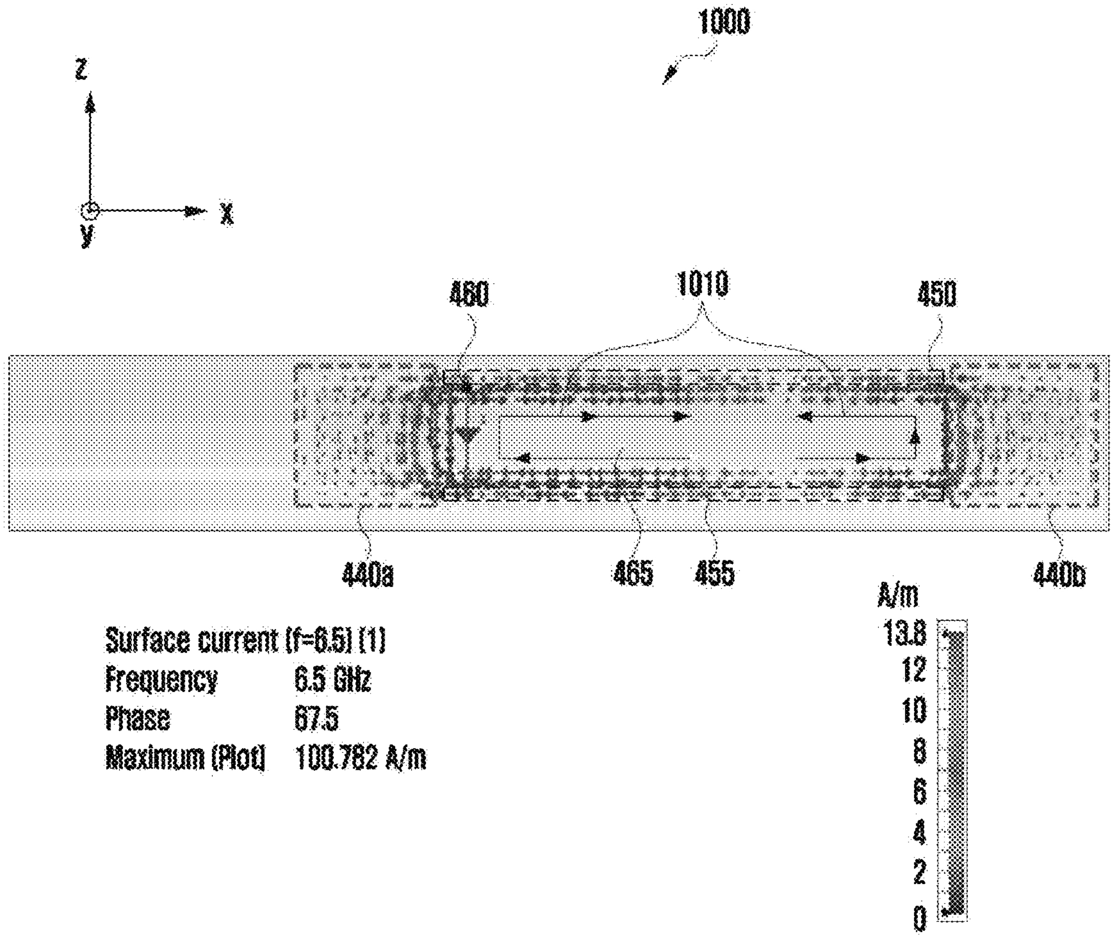
FIG. 10 is a diagram illustrating a current flow in a slot formed on side surfaces of a first substrate, a second substrate, and a third substrate, according to an embodiment.

FIG. 10 is a diagram 1000 illustrating a current flow in a slot 465 formed on side surfaces of the first substrate 415, the second substrate 420, and the third substrate 425, according to an embodiment.

Referring to FIG. 10, the electronic device 200 includes at least two conductive patches 440*a* and 440*b* attached to connect a side surface of a first substrate 415, a side surface of a second substrate 420, and a side surface of a third substrate 425 to one another. The first conductive patch 440*a* and the second conductive patch 440*b* may be attached to connect the side surface of the first substrate 415, the side surface of the second substrate 420, and the side surface of the third substrate 425 to one another and may be connected to each other via the first electrical path 450 and the second electrical path 455, thereby forming the slot 465. A feeding point 460 on the first electrical path 450 may be connected to a communication circuit 475 via a third electrical path 470 and the second electrical path 455 may be connected to a ground 430, whereby the first substrate 415, the second substrate 420, the third substrate 425, the first conductive patch 440*a*, the second conductive patch 440*b*, and the slot 465 may operate as a slot antenna 390.

Referring to FIG. 10, a current may flow inside the slot 465 in the direction shown by the reference numeral 1010 when the feeding point 460 of the first electrical path 450 connecting the first conductive patch 440*a* and the second conductive patch 440*b* to each other is connected to the communication circuit 475 via the third electrical path 470. The energy distribution by the current formed inside the slot 465 may be confirmed based on the distribution of the current flowing in the direction shown by reference number 1010.

Figure 11:
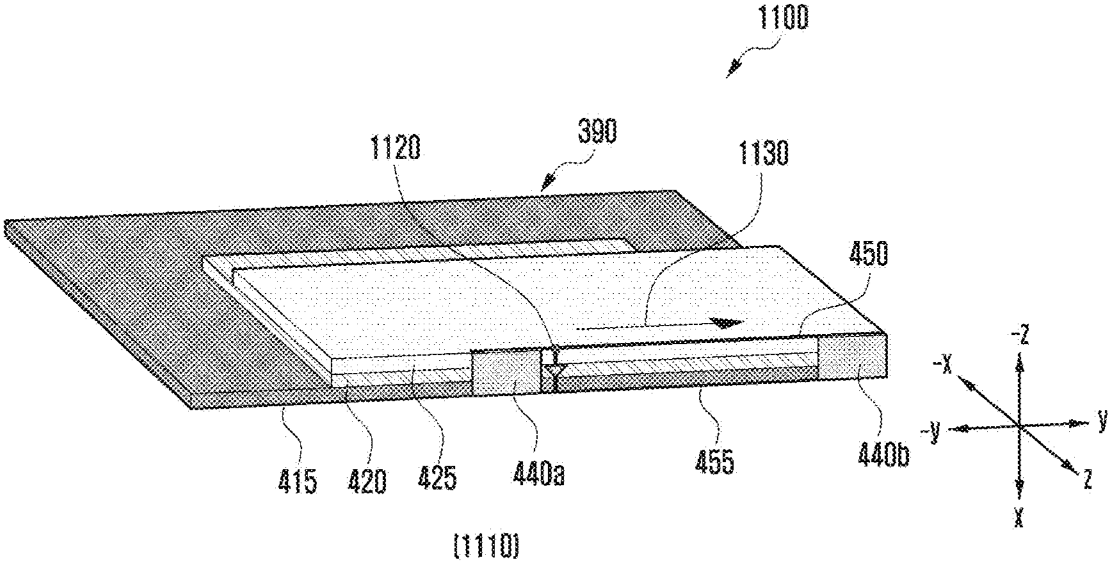
FIG. 11 is a diagram illustrating a radiation pattern of a slot antenna, according to an embodiment.
Figure 11:
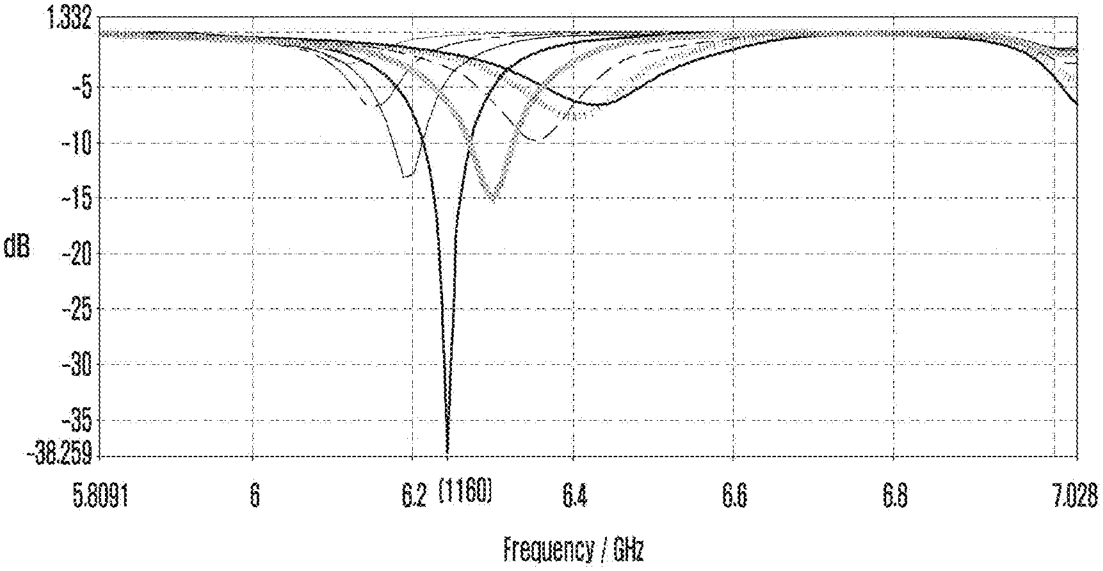

FIG. 11 is a diagram 1100 illustrating a radiation pattern of the slot antenna 390, according to an embodiment.

In describing elements of the electronic device 200 shown in FIG. 11, the same reference numerals are assigned to the elements substantially the same as those of the electronic device 200 of FIG. 4, described above, and a detailed description thereof may be omitted.

Referring to FIG. 11, as shown by reference numeral 1110, the electronic device 200 includes a first substrate 415, a second substrate 420, and a third substrate 425. The first substrate 415 may be disposed in an inner space of the electronic device 200. The second substrate 420 may be disposed on a first surface facing in the first direction (e.g., the −z axis direction) of the first substrate 415. The third substrate 425 may be disposed on a first surface facing in the first direction (e.g., the −z axis direction) of the second substrate 420.

The electronic device 200 may include at least two conductive patches 440*a* and 440*b* attached to connect the side surface of the first substrate 415, the side surface of the second substrate 420, and the side surface of the third substrate 425 to one another.

The first conductive patch 440*a* and the second conductive patch 440*b* may be connected to a communication circuit 475 via the first electrical path 450. For example, a feeding point 1120 (e.g., the feeding point 460 of FIG. 4) on the first electrical path 450 may be electrically connected to a communication circuit 475 disposed on the first surface of the first substrate 415 via a third electrical path 470.

As shown by reference numeral 1150, when the communication circuit 475 is electrically connected to the feeding point 1120 at a specific location on the first electrical path 450, the slot antenna 390 having a specific frequency band 1160 (e.g., about 6.25 GHz band) may be available.

When a position of the feeding point 460 on the first electrical path 450 is moved 1130, the slot antenna 390 may have an adjusted frequency band (e.g., about 6.3 GHz to 7 GHz frequency band), and thus may be implemented to be resonant in the adjusted frequency band (e.g., about 6.3 GHz to 7 GHz frequency band).

Figure 12:
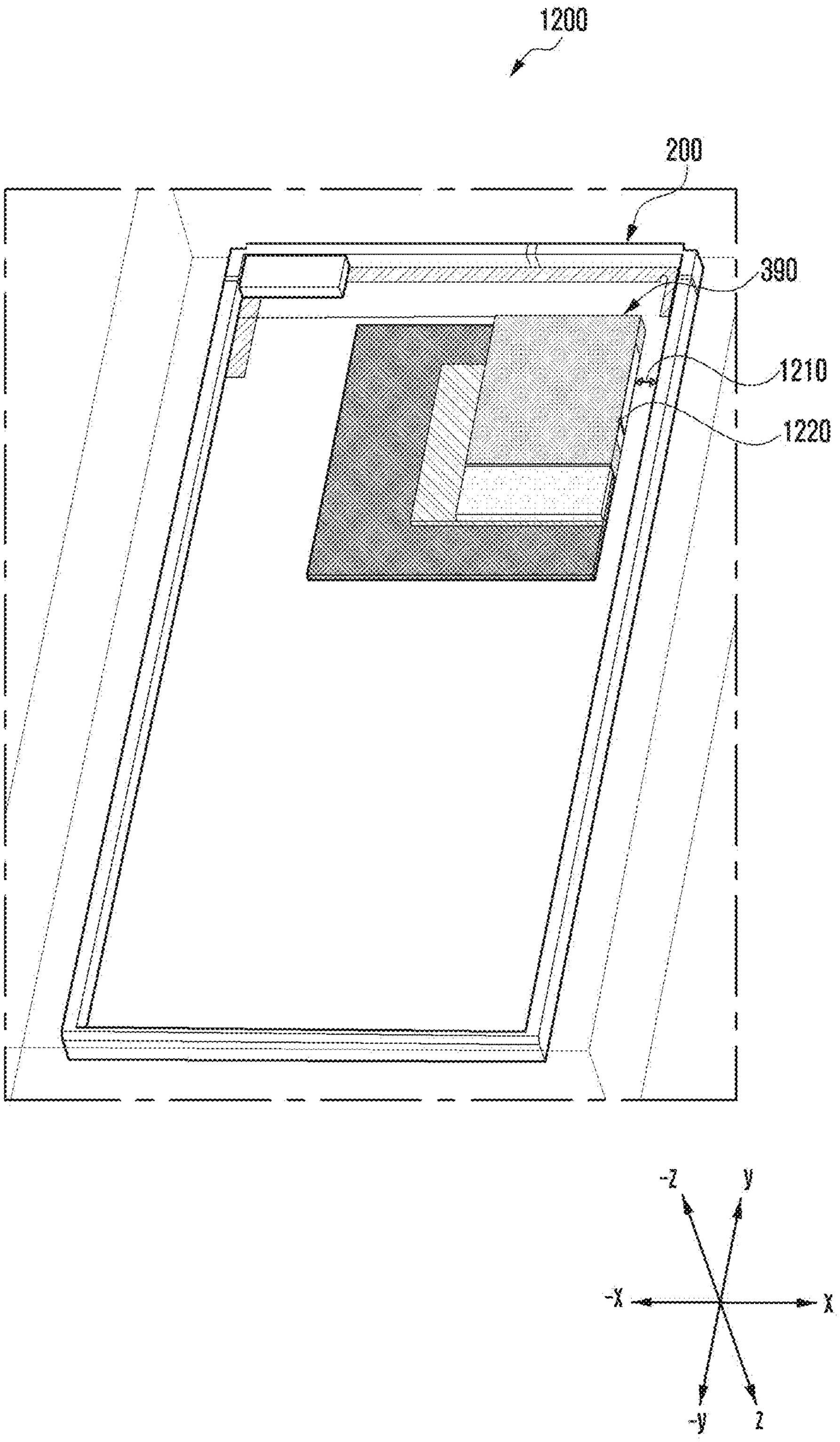
FIG. 12 is a diagram illustrating a slot antenna disposed in an inner space of an electronic device, according to an embodiment.
Figure 13:
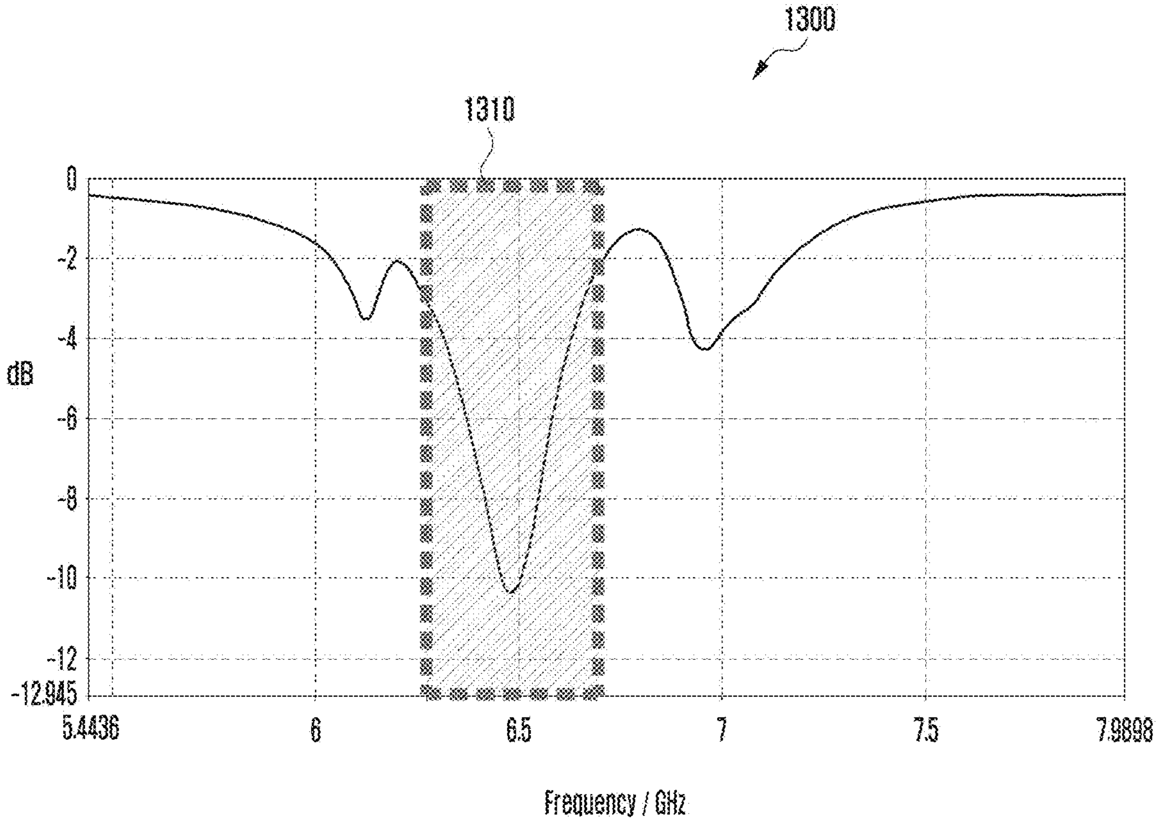
FIG. 13 is a diagram illustrating a resonant frequency when a slot antenna is disposed in an inner space of the electronic device of FIG. 12, according to an embodiment.

FIG. 12 is a diagram 1200 illustrating the slot antenna 390 disposed in an inner space of the electronic device 200, according to an embodiment. FIG. 13 is a diagram 1300 illustrating a resonant frequency when the slot antenna 390 is disposed in the inner space of the electronic device 200 of FIG. 12, according to an embodiment.

Referring to FIG. 12, the exterior of a housing of the electronic device 200 may be formed of a conductive member (e.g., metal). The slot antenna 390 may be disposed in the inner space of the electronic device 200 having a housing formed of a conductive member. For example, the side surface part of the slot antenna 390 and the conductive member of the housing of the electronic device 200 may be disposed to be spaced apart from each other by a predetermined interval 1210 (e.g., about 1.5 millimeters (mm)).

Referring to FIG. 13, when a feeding point 1220 is electrically connected at a specific location on the first electrical path 450 to a communication circuit 475, the slot antenna 390 operating in, for example, about 6.4 GHz band 1310 may be available.

Even when the slot antenna 390 is disposed in the inner space of the electronic device 200 and the outer housing of the electronic device 200 is formed of a conductive member, a wireless signal transmitted to the outside from the arranged slot antenna 390 may not be partially distorted or blocked at any rate by the conductive member the slot antenna 390 disposed in the inner space of the electronic device 200, and accordingly, the radiation performance of the slot antenna 390 may not be deteriorated.

Figure 14:
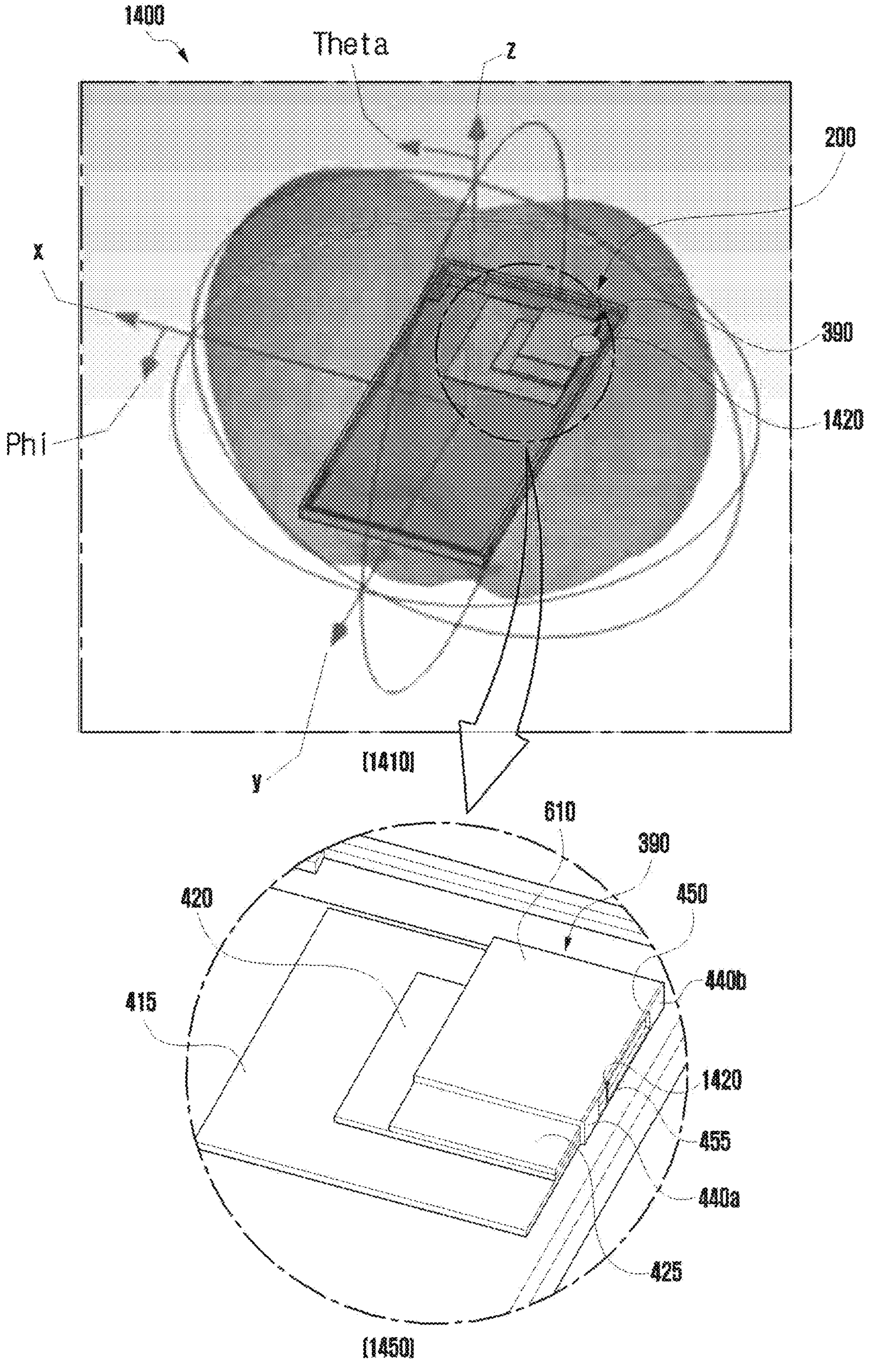
FIG. 14 is a diagram illustrating a radiation pattern of a slot antenna when the slot antenna is disposed in an inner space of the electronic device of FIG. 12, according to an embodiment.
Figure 15:
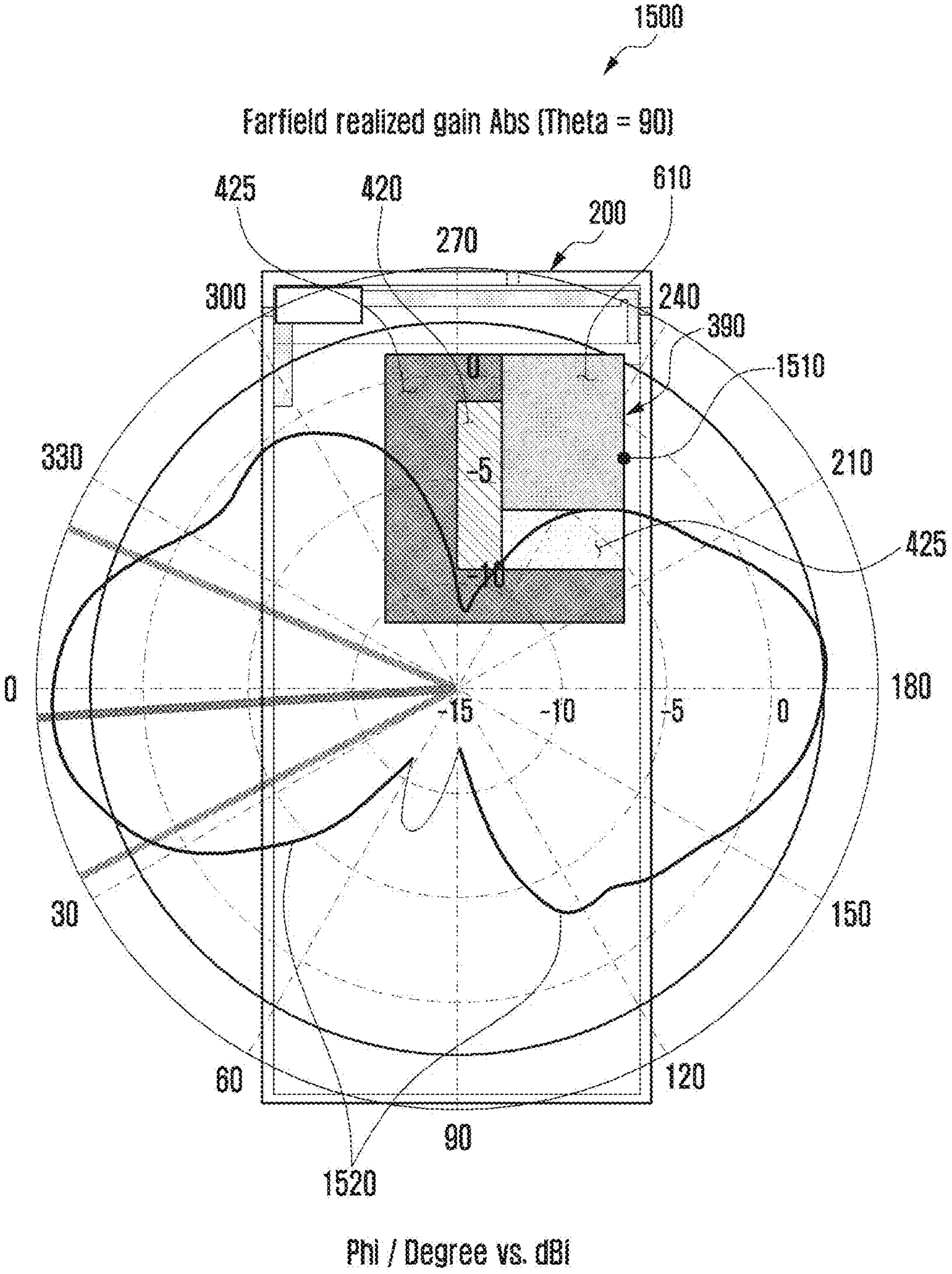
FIG. 15 is a diagram illustrating a radiation pattern of a slot antenna when the slot antenna is disposed in an inner space of the electronic device of FIG. 12, according to an embodiment.

FIG. 14 is a diagram 1400 illustrating a radiation pattern of the slot antenna 390 when the slot antenna 390 is disposed in the inner space of the electronic device 200 of FIG. 12, according to an embodiment. FIG. 15 is a diagram 1500 illustrating a radiation pattern of the slot antenna 390 when the slot antenna is disposed in the inner space of the electronic device 200 of FIG. 12, according to an embodiment.

Reference numerals 1410 of FIG. 14 and FIG. 15 illustrate radiation patterns of the slot antenna 390 when the slot antenna 390 is disposed in the inner space of an electronic device 200 of FIG. 12, described above, the exterior of the housing of which is formed of a conductive member. Reference number 1450 of FIG. 14 is an enlarged representation of the slot antenna 390 disposed in the inner space of the electronic device 200.

As noted with reference to FIGS. 14 and 15, when the feeding point 1420 or 1510 (e.g., the feeding point 460 of FIG. 4) on the first electrical path 450 connecting the first conductive patch 440*a* and the second conductive patch 440*b* is electrically connected to a communication circuit 475, the slot antenna 390 forms a radiation pattern having a structure radiating to the side surfaces (e.g., the x axis) of the first substrate 415, the second substrate 420, and the third substrate 425 to which the first conductive patch 440*a* and the second conductive patch 440*b* are attached.

A resonance frequency by a conductive component may be shifted (e.g., about 100 megahertz (MHz)) due to the conductive member (e.g., metal) constituting the exterior of the electronic device 200.

As noted from a comparison between the radiation pattern according to the embodiment in which the slot antenna 390 of FIG. 14 is disposed in the inner space of the electronic device 200 and the radiation pattern according to the embodiment in which the slot antenna 390 of FIG. 8 is not disposed in the inner space of the electronic device 200 (e.g., using a PCB structure), there is a difference therebetween. For example, the slot antenna 390 radiates in a direction (e.g., the z axis direction) perpendicular to the surface on which the slot 465 is formed and radiates in the open-ended direction in the horizontal direction (e.g., the x axis direction) of the slot 465 at the same time, and the radiation pattern is constant.

As noted from various embodiments, the radiation pattern 1520 in which the slot antenna 390 of FIG. 14 is disposed in the inner space of the electronic device 200 and the radiation pattern 920 of the slot antenna 390 (e.g., the PCB structure) of FIG. 9, described above, may have a difference in a resonance frequency shift and/or a far field radiation pattern due to a ground change, but the effect is insignificant.

As noted from various embodiments, when the slot antenna 390 of FIG. 14 is disposed in the inner space of the electronic device 200, the outer housing of which is formed of a conductive member, the slot antenna 390 may have a radiation pattern 1520 similar to the radiation pattern 920 of the slot antenna 390 in the PCB structure of FIG. 9, and thus a wireless signal transmitted from the slot antenna 390 to the outside is not partially distorted or blocked at any rate by the conductive member. Accordingly, the performance of the antenna may be improved.

Figure 16:
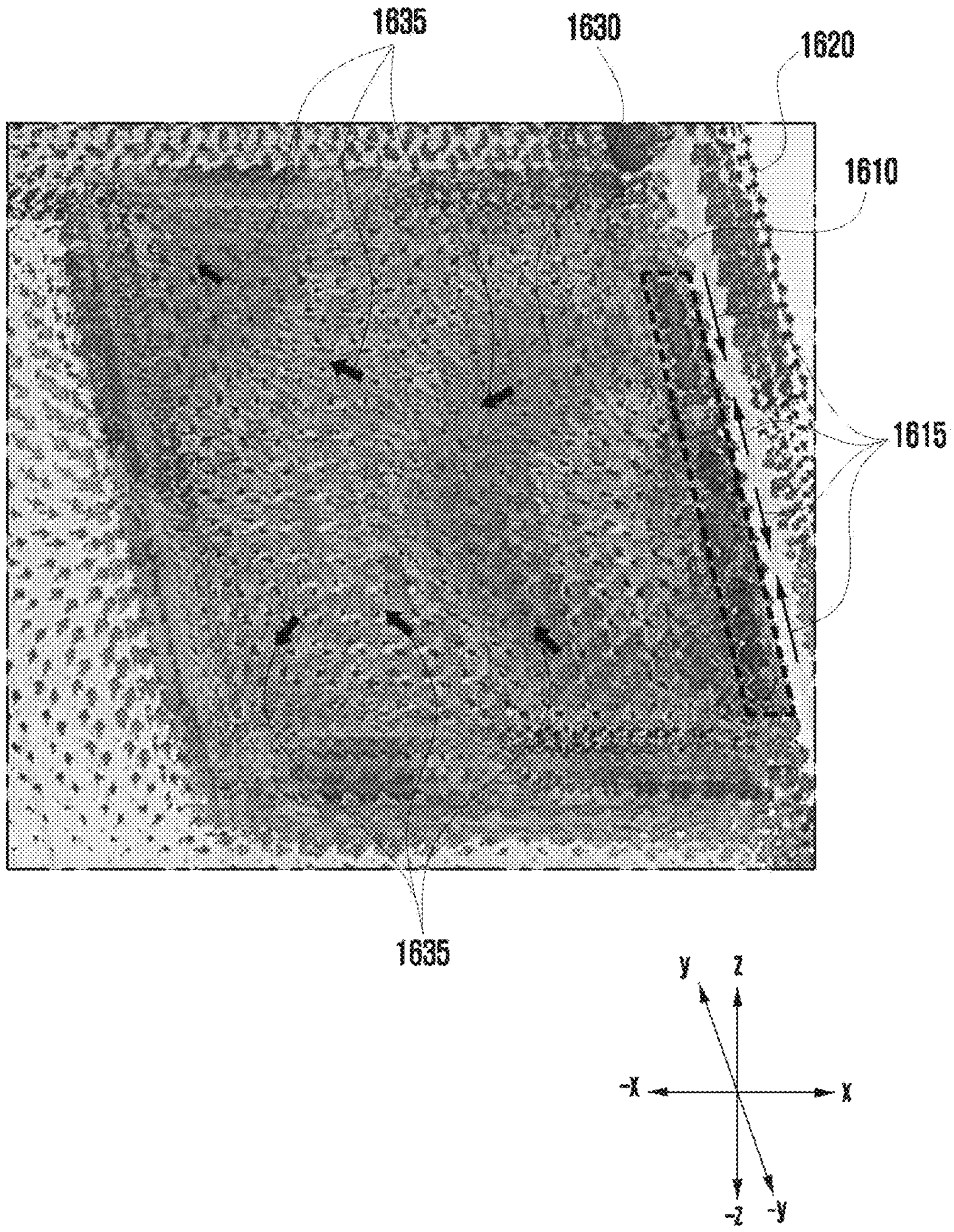
FIG. 16 is a diagram illustrating a current flow in a slot antenna when the slot antenna is disposed in an inner space of the electronic device of FIG. 12, according to an embodiment.

FIG. 16 is a diagram 1600 illustrating a current flow in the slot antenna 390 when the slot antenna is disposed in the inner space of the electronic device 200 of FIG. 12, according to an embodiment.

FIG. 16 illustrates a current flow in the slot antenna 390 when the slot antenna 390 is disposed in the inner space of the electronic device 200 of FIG. 12, described above, the exterior of the housing of which is formed of a conductive member.

The electronic device 200 may include at least two conductive patches 440*a* and 440*b* attached to connect a side surface of a first substrate 415, a side surface of a second substrate 420, and a side surface of a third substrate 425 to one another. The first conductive patch 440*a* and the second conductive patch 440*b* may be attached to connect the side surface of the first substrate 415, the side surface of the second substrate 420, and the side surface of the third substrate 425 to one another and may be connected to each other via the first electrical path 450 and the second electrical path 455, thereby forming the slot 465. A feeding point 460 on the first electrical path 450 may be connected to a communication circuit 475 via a third electrical path 470 and the second electrical path 455 may be connected to the ground 430, whereby the first substrate 415, the second substrate 420, the third substrate 425, the first conductive patch 440*a*, the second conductive patch 440*b*, and the slot 465 may operate as a slot antenna 390.

Referring to FIG. 16, when the feeding point 460 of the first electrical path 450 connecting the first conductive patch 440*a* and the second conductive patch 440*b* to each other is connected to the communication circuit 475 via the third electrical path 470, a current 1610 may be formed in the slot antenna 390 in the first direction and/or the second direction 1615 (e.g., the −z axis direction and/or the z axis direction) from the conductive member 1620 of the exterior and a radiation pattern 1630 may be formed in the third direction 1635 (e.g., the −x axis direction).

As noted from FIG. 16 the influence on the radiation performance of the slot antenna 390 due to the conductive member may be insignificant when the current 1610 is formed in the slot antenna 390 and the radiation pattern 1630 is formed in the third direction (e.g., the −x axis direction).

Figure 17:
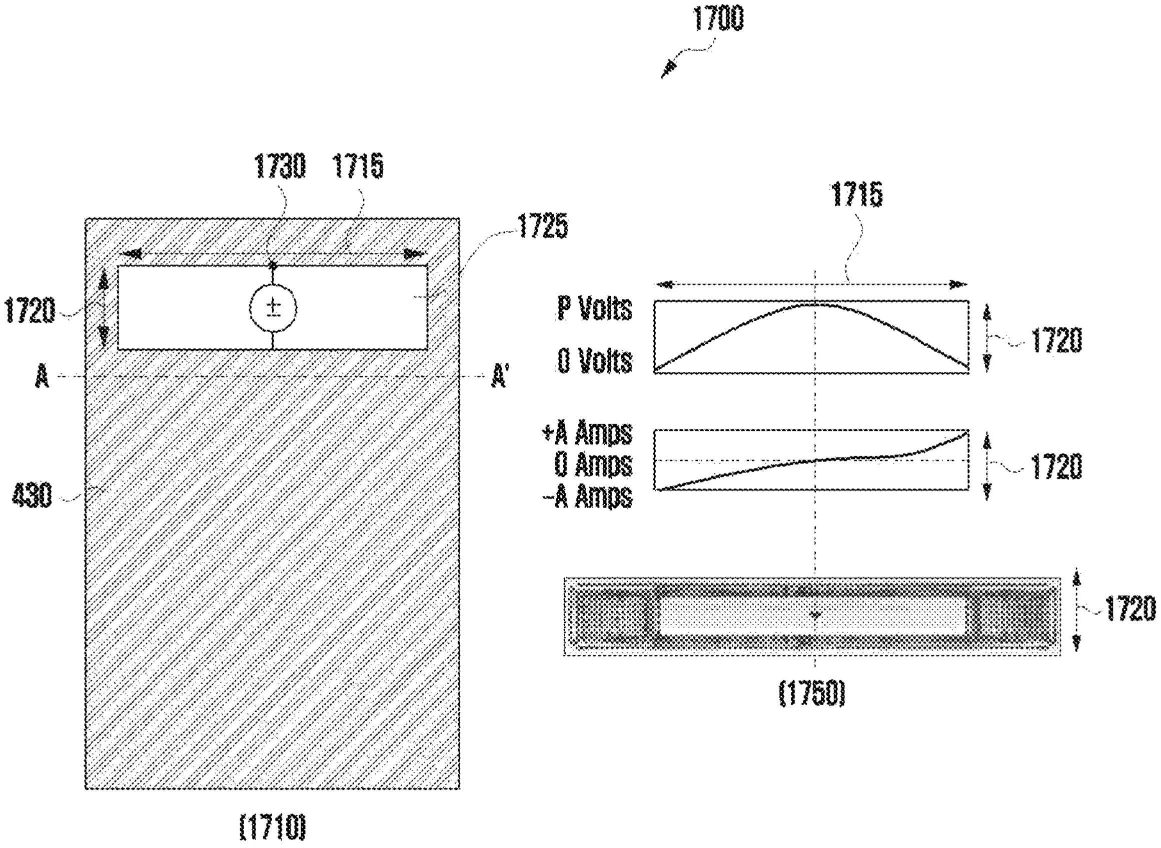
FIG. 17 is a diagram illustrating a planar structure of a slot antenna, according to an embodiment.

FIG. 17 is a diagram 1700 illustrating a planar structure of the slot antenna 390, according to an embodiment.

The electronic device 200 may include at least two conductive patches 440*a* and 440*b* attached to connect a side surface of a first substrate 415, a side surface of a second substrate 420, and a side surface of a third substrate 425 to one another. The first conductive patch 440*a* and the second conductive patch 440*b* may be attached to connect the side surface of the first substrate 415, the side surface of the second substrate 420, and the side surface of the third substrate 425 to one another and may be connected to each other via the first electrical path 450 and the second electrical path 455, thereby forming the slot 465. A feeding point 460 on the first electrical path 450 is connected to a communication circuit 475 via a third electrical path 470 and the second electrical path 455 is connected to a ground 430, the first substrate 415, the second substrate 420, the third substrate 425, the first conductive patch 440*a*, the second conductive patch 440*b*, and the slot 465, and may operate as a slot antenna 390.

Referring to FIG. 17, reference numeral 1710 illustrates a case in which the slot antenna 390 is spread with reference to line A-A'.

A slot 1725 may be formed to have a first length 1715 and a first height 1720. The slot antenna 390 may resonate at a point 1730 at which the first length 1715 of the slot 1725 corresponds to ½ of wavelength (λ) corresponding to a center frequency in a frequency band. The slot antenna 390 may be a transmission line, and accordingly, when the transmission line is short-circuited, a difference in phase between voltage and current may be 90 degrees. For example, the voltage may have a maximum value (e.g., P volts) at the center (e.g., λ/2 1730) of the slot antenna 390. The current may have 0 Amps at the center (e.g., λ/2 1730) of the slot antenna 390 and may have a maximum value toward the right from the center (e.g., λ/2 1730).

If the right side of the slot 1725 is removed, an antenna in the form of an inverted F antenna (IFA) may be formed, and accordingly, a radiation pattern similar to that of an IFA antenna may be formed. Accordingly, the radiation performance of the slot antenna 390 may be determined by the ground 430, and the radiation performance deterioration due to the housing which is formed of a conductive member may not occur.

The electronic device 200 according to an embodiment may include a housing (e.g., the housing 210 of FIGS. 2A and 2B), a first substrate 415 disposed in an inner space of the housing 210, a second substrate 420 disposed on a first surface (e.g., a first surface facing in a first direction (e.g., the −z axis direction) of FIG. 4) of the first substrate 415, a third substrate 425 disposed on a first surface (e.g., a first surface facing in the first direction (e.g., the −z axis direction) of FIG. 4) of the second substrate 420, a first conductive patch 440*a* attached to at least a partial region of the side surfaces of the first substrate 415, the second substrate 420, and the third substrate 425, and a second conductive patch 440*b* attached to at least another partial region of the side surfaces of the first substrate 415, the second substrate 420, and the third substrate 425. The first conductive patch 440*a* and the second conductive patch 440*b* may be connected to each other via a first electrical path 450 and a second electrical path 455, a feeding point 460 on the first electrical path 450 may be electrically connected to the communication circuit 475 disposed on the first surface of the first substrate 415 via the third electrical path 470 and, the second electrical path may be electrically connected to the ground 430 disposed on a second surface (e.g., the second surface facing in a second direction (e.g., the z axis direction) opposite to the first direction of FIG. 4) of the first substrate 415.

The electronic device 200 may further include a feeding line (e.g., the feeding line 465 of FIG. 4) formed in the vertical direction from the feeding point 460 on the first electrical path 450 to the second substrate 420.

The feeding point 460 may be connected to the third electrical path 470 via the feeding line 465.

The third electrical path 470 may be electrically connected to the communication circuit 475 through the transmission line (e.g., the transmission line 490 of FIG. 4) and a connector (e.g., the connector 485 of FIG. 4) disposed on the first surface of the first substrate 415.

The first conductive patch 440*a* and the second conductive patch 440*b* may be attached to connect the side surfaces of the first substrate 415, the second substrate 420, and the third substrate 425 to one another and may be connected to each other via the first electrical path 450 and the second electrical path 455, thereby forming a slot (e.g., the slot 465 of FIG. 4) on the side surfaces of the first substrate 415, the second substrate 420, and the third substrate 425.

The feeding point 460 on the first electrical path 450 may be electrically connected to the communication circuit 475 via the third electrical path 470, and the second electrical path 455 may be electrically connected to the ground 430, thereby operating as a slot antenna 390 having a predetermined frequency band.

The predetermined frequency band may include a frequency band ranging from about 2.4 GHz to about 30 GHz.

The predetermined frequency band may be adjusted according to a position of the feeding point 460 on the first electrical path 450.

The housing 210 may include a front plate (e.g., the front plate 202 of FIG. 2A), a rear plate (e.g., the rear plate 211 of FIG. 2B) facing in the opposite direction to the front plate 202, and a side member (e.g., the side bezel structure 218 of FIGS. 2A and 2B) surrounding the inner space between the front plate 202 and the rear plate 211.

The housing 210 may be formed of a conductive member.

When the feeding point 460 on the first electrical path 450 is electrically connected to the communication circuit 475 via the third electrical path 470, and the second electrical path 455 is electrically connected to the ground 430, a current may be formed in the slot 465 formed on side surfaces of the first substrate 415, the second substrate 420, and the third substrate 425.

When the current is formed in the slot 465, a radiation pattern may be formed in a direction in which the side member 218 is disposed, which is a direction in which the slot 465 is formed.

When the feeding point 460 on the first electrical path 450 is electrically connected to the communication circuit 475 via the third electrical path 470, and the second electrical path 455 is electrically connected to the ground 430, a radiation pattern may be further formed in a direction in which the rear plate 211 is disposed, with respect to the side surface on which the slot 465 is formed.

An antenna structure may be disposed on a second surface (e.g., the second surface facing in the second direction (e.g., the z axis direction) of FIG. 4) of the ground 430, and the rear plate 211 may be disposed on a second surface of the antenna structure.

The antenna structure may include a plurality of conductive patterns.

The plurality of conductive patterns may include a plurality of patch antennas.

The plurality of conductive patterns may include a plurality of sub-6 antennas.

The electronic device 200 may further include a plurality of antenna modules (e.g., the antenna module 197 of FIG. 1) configured to transmit and/or receive a wireless signal, and a processor (e.g., the processor 120 of FIG. 1). The processor 120 may be configured to control activation of the plurality of antenna modules and/or the slot antenna 390, based on an arrangement state of the electronic device 200 and/or whether the electronic device 200 is gripped or not.

The arrangement state of the electronic device 200 may include a landscape mode and a portrait mode.

The processor 120 may be configured to, when an antenna for transmitting and/or receiving a wireless signal among the plurality of antenna modules is deactivated based on the arrangement state of the electronic device 200 and whether the electronic device 200 is gripped or not, activate the slot antenna 390 in place of the deactivated antenna, and transmit and/or receive the wireless signal by using the activated slot antenna 390 and/or at least one antenna of the plurality of antenna modules, except for the deactivated antenna.

The feeding point 460 on the first electrical path 450 may be formed at a position at which a length of the formed slot corresponds to ½ of wavelength λ. The electronic device 200 may further include a ground 610 disposed on a first surface (e.g., the first surface facing in the first direction (e.g., the −z axis direction) of FIG. 4) of the third substrate 425.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
- a housing;
- a first substrate disposed in an inner space of the housing;
- a second substrate disposed on a first surface of the first substrate;
- a third substrate disposed on a first surface of the second substrate;
- a first conductive patch attached to at least a partial region of side surfaces of the first substrate, the second substrate, and the third substrate; and
- a second conductive patch attached to at least another partial region of the side surfaces of the first substrate, the second substrate, and the third substrate,
- wherein the first conductive patch and the second conductive patch are connected to each other via a first electrical path and a second electrical path,
- wherein a feeding point on the first electrical path is electrically connected to a communication circuit disposed on the first surface of the first substrate via a third electrical path, and
- wherein the second electrical path is electrically connected to a ground disposed on a second surface of the first substrate.

2. The electronic device of claim 1, further comprising a feeding line formed in a vertical direction from the feeding point on the first electrical path to the second substrate.

3. The electronic device of claim 2, wherein the feeding point is connected to the third electrical path via the feeding line, and
- wherein the third electrical path is electrically connected to the communication circuit through a transmission line and a connector disposed on the first surface of the first substrate.

4. The electronic device of claim 1, wherein the first conductive patch and the second conductive patch are attached to connect the side surfaces of the first substrate, the second substrate, and the third substrate to one another, and are connected to each other via the first electrical path and the second electrical path, thereby forming a slot on the side surfaces of the first substrate, the second substrate, and the third substrate.

5. The electronic device of claim 4, wherein the feeding point on the first electrical path is electrically connected to the communication circuit via the third electrical path, and the second electrical path is electrically connected to the ground, thereby operating as a slot antenna having a predetermined frequency band.

6. The electronic device of claim 5, wherein the predetermined frequency band comprises a frequency band ranging from about 2.4 gigahertz (GHz) to about 30 GHz.

7. The electronic device of claim 5, wherein the predetermined frequency band is adjusted according to a position of the feeding point on the first electrical path.

8. The electronic device of claim 5, wherein the housing comprises:
- a front plate;
- a rear plate facing in an opposite direction to the front plate; and
- a side member surrounding the inner space between the front plate and the rear plate,
- wherein the housing is formed of a conductive member.

9. The electronic device of claim 8, wherein when the feeding point on the first electrical path is electrically connected to the communication circuit via the third electrical path, and the second electrical path is electrically connected to the ground, a current is formed in the slot formed on side surfaces of the first substrate, the second substrate, and the third substrate.

10. The electronic device of claim 9, wherein when the current is formed in the slot, a radiation pattern is formed in a direction in which the side member is disposed, which is a direction in which the slot is formed.

11. The electronic device of claim 9, wherein when the feeding point on the first electrical path is electrically connected to the communication circuit via the third electrical path, and the second electrical path is electrically connected to the ground, a radiation pattern is further formed in a direction in which the rear plate is disposed, with respect to the side surface on which the slot is formed.

12. The electronic device of claim 8, wherein an antenna structure is disposed on a second surface of the ground, and
- wherein the rear plate is disposed on a second surface of the antenna structure.

13. The electronic device of claim 12, wherein the antenna structure comprises a plurality of conductive patterns.

14. The electronic device of claim 13, wherein the plurality of conductive patterns comprise a plurality of patch antennas.

15. The electronic device of claim 13, wherein the plurality of conductive patterns comprise a plurality of sub-6 antennas.

16. The electronic device of claim 5, further comprising:
- a plurality of antenna modules configured to transmit or receive a wireless signal; and
- a processor,
- wherein the processor is configured to control activation of at least one of the plurality of antenna modules or the slot antenna, based on at least one of an arrangement state of the electronic device or whether the electronic device is gripped or not.

17. The electronic device of claim 16, wherein the arrangement state of the electronic device comprises a landscape mode and a portrait mode.

18. The electronic device of claim 17, wherein the processor is further configured to:
- when an antenna for transmitting or receiving a wireless signal among the plurality of antenna modules is deactivated based on the at least one of the arrangement state of the electronic device or whether the electronic device is gripped or not, activate the slot antenna in place of the deactivated antenna, and
- transmit or receive the wireless signal by using at least one of the activated slot antenna or at least one antenna of the plurality of antenna modules, except for the deactivated antenna.

19. The electronic device of claim 4, wherein the feeding point on the first electrical path is formed at a position at which a length of the formed slot corresponds to ½ of wavelength λ.

20. The electronic device of claim 1, further comprising a ground disposed on a first surface of the third substrate.

* * * * *